(12) United States Patent
Levin et al.

(10) Patent No.: US 7,489,309 B2
(45) Date of Patent: *Feb. 10, 2009

(54) CONTROL KNOB WITH MULTIPLE DEGREES OF FREEDOM AND FORCE FEEDBACK

(75) Inventors: Michael D. Levin, Sunnyvale, CA (US); Kenneth M. Martin, Palo Alto, CA (US); Bruce M. Schena, Menlo Park, CA (US); Adam C. Braun, Sunnyvale, CA (US); Louis B. Rosenberg, San Jose, CA (US)

(73) Assignee: Immersion Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/603,294

(22) Filed: Nov. 21, 2006

(65) Prior Publication Data

US 2007/0152988 A1 Jul. 5, 2007

Related U.S. Application Data

(60) Continuation of application No. 10/712,199, filed on Nov. 13, 2003, now Pat. No. 7,233,313, which is a continuation of application No. 09/680,408, filed on Oct. 2, 2000, now Pat. No. 6,686,911, which is a continuation-in-part of application No. 09/087,022, filed on May 29, 1998, now Pat. No. 6,061,004, which is a continuation-in-part of application No. 09/049,155, filed on Mar. 26, 1998, now Pat. No. 6,128,006, which is a division of application No. 08/756,745, filed on Nov. 26, 1996, now Pat. No. 5,825,308.

(51) Int. Cl.
*G09G 5/00* (2006.01)
*G06F 3/033* (2006.01)

(52) U.S. Cl. .......... 345/184; 345/156; 345/161; 345/163; 345/167

(58) Field of Classification Search .......... 345/156–184
See application file for complete search history.

(56) References Cited

U.S. PATENT DOCUMENTS 3,157,853 A 11/1964 Hirsch (Continued)

FOREIGN PATENT DOCUMENTS

DE 4400790 A1 5/1995
EP 0265011 4/1988

OTHER PUBLICATIONS

Adachi, Y. et al., "Sensory Evaluation of Virtual Haptic Push-Buttons," Technical Research Center, Suzuki Motor Corp., 1994, pp. 1-7.

(Continued)

*Primary Examiner*—Richard Hjerpe
*Assistant Examiner*—Srilakshmi K Kumar
(74) *Attorney, Agent, or Firm*—Kilpatrick Stockton LLP

(57) ABSTRACT

The present invention provides a control knob on a device that allows a user to control functions of the device. In one embodiment, the knob is rotatable in a rotary degree of freedom and moveable in at least one transverse direction approximately perpendicular to the axis. An actuator is coupled to the knob to output a force in the rotary degree of freedom about the axis, thus providing force feedback. In a different embodiment, the knob is provided with force feedback in a rotary degree of freedom about an axis and is also moveable in a linear degree of freedom approximately parallel to the axis, allowing the knob to be pushed and/or pulled by the user. The device controlled by the knob can be a variety of types of devices, such as an audio device, video device, etc. The device can also include a display providing an image updated in response to manipulation of the knob. Detent forces can be provided for the knob by overlapping and adjusting ranges of closely-spaced detents in the rotary degree of freedom of the knob.

7 Claims, 11 Drawing Sheets

U.S. PATENT DOCUMENTS

| | | | |
|---|---|---|---|
| 3,220,121 A | 11/1965 | Cutler | |
| 3,497,668 A | 2/1970 | Hirsch | |
| 3,517,446 A | 6/1970 | Corlyon et al. | |
| 3,902,687 A | 9/1975 | Hightower | |
| 3,903,614 A | 9/1975 | Diamond et al. | |
| 3,919,691 A | 11/1975 | Noll | 340/172.5 |
| 3,944,798 A | 3/1976 | Eaton | 235/151.3 |
| 4,050,265 A | 9/1977 | Drennen et al. | 64/11 |
| 4,125,800 A | 11/1978 | Jones | 318/681 |
| 4,131,033 A | 12/1978 | Wright et al. | 74/553 |
| 4,148,014 A | 4/1979 | Burson | 340/709 |
| 4,160,508 A | 7/1979 | Salsbury | |
| 4,236,325 A | 12/1980 | Hall et al. | |
| 4,477,043 A | 10/1984 | Repperger | 244/223 |
| 4,513,235 A | 4/1985 | Acklam et al. | |
| 4,560,983 A | 12/1985 | Williams | 340/825 |
| 4,581,491 A | 4/1986 | Boothroyd | |
| 4,599,070 A | 7/1986 | Hladky et al. | |
| 4,654,648 A | 3/1987 | Herrington et al. | 340/710 |
| 4,692,756 A | 9/1987 | Clark | 340/709 |
| 4,706,294 A | 11/1987 | Ouchida | 381/109 |
| 4,708,656 A | 11/1987 | De Vries et al. | |
| 4,712,101 A | 12/1987 | Culver | 340/710 |
| 4,713,007 A | 12/1987 | Alban | |
| 4,724,715 A | 2/1988 | Culver | 74/471 R |
| 4,734,685 A | 3/1988 | Watanabe | 340/710 |
| 4,782,327 A | 11/1988 | Kley et al. | 340/365 |
| 4,787,051 A | 11/1988 | Olson | 364/518 |
| 4,795,296 A | 1/1989 | Jau | 414/5 |
| 4,798,919 A | 1/1989 | Miessler et al. | 178/18 |
| 4,800,721 A | 1/1989 | Cemenska et al. | 60/393 |
| 4,811,608 A | 3/1989 | Hilton | 73/862.04 |
| 4,823,634 A | 4/1989 | Culver | 74/471 |
| 4,839,838 A | 6/1989 | LaBiche et al. | 364/709.11 |
| 4,868,549 A | 9/1989 | Affinito et al. | 340/710 |
| 4,879,556 A | 11/1989 | Duimel | 341/20 |
| 4,891,764 A | 1/1990 | McIntosh | |
| 4,930,770 A | 6/1990 | Baker | |
| 4,934,694 A | 6/1990 | McIntosh | |
| 4,935,728 A | 6/1990 | Kley | 340/709 |
| 4,943,866 A | 7/1990 | Barker et al. | 358/335 |
| 4,949,119 A | 8/1990 | Moncrief et al. | 364/578 |
| 4,961,138 A | 10/1990 | Gorniak | 364/200 |
| 4,961,267 A | 10/1990 | Herzog | 33/503 |
| 4,964,004 A | 10/1990 | Barker | 360/14.1 |
| 4,979,050 A | 12/1990 | Westland et al. | 360/14.1 |
| 4,983,786 A | 1/1991 | Stevens David et al. | 178/18 |
| 4,983,901 A | 1/1991 | Lehmer | 318/685 |
| 5,007,300 A * | 4/1991 | Siva | 74/471 XY |
| 5,019,761 A | 5/1991 | Kraft | |
| 5,022,407 A | 6/1991 | Horch et al. | |
| 5,035,242 A | 7/1991 | Franklin | |
| 5,038,089 A | 8/1991 | Szakaly | |
| 5,044,956 A | 9/1991 | Behensky et al. | 434/45 |
| 5,065,145 A | 11/1991 | Purcell | 340/706 |
| 5,078,152 A | 1/1992 | Bond | |
| 5,095,303 A | 3/1992 | Clark et al. | 340/710 |
| 5,103,404 A | 4/1992 | McIntosh | 318/568.22 |
| 5,107,080 A | 4/1992 | Rosen | 200/6 |
| 5,107,262 A | 4/1992 | Cadoz et al. | 341/22 |
| 5,113,179 A | 5/1992 | Scott-Jackson et al. | 340/710 |
| 5,116,051 A | 5/1992 | Moncrief et al. | 273/448 B |
| 5,138,154 A | 8/1992 | Hotelling | 250/231.12 |
| 5,139,261 A | 8/1992 | Openiano | 273/148 |
| 5,143,505 A | 9/1992 | Burdea et al. | 414/5 |
| 5,146,566 A | 9/1992 | Hollis, Jr. et al. | 395/275 |
| 5,181,181 A | 1/1993 | Glynn | 364/566 |
| 5,184,319 A | 2/1993 | Kramer | 364/806 |
| 5,185,561 A | 2/1993 | Good et al. | 318/432 |
| 5,186,629 A | 2/1993 | Rohen | 434/114 |
| 5,186,695 A | 2/1993 | Mangseth et al. | |
| 5,189,355 A | 2/1993 | Larkins et al. | 318/685 |
| 5,193,963 A | 3/1993 | McAffee et al. | 414/5 |
| 5,204,600 A | 4/1993 | Kahkoska | 318/602 |
| 5,212,473 A | 5/1993 | Louis | |
| 5,220,260 A | 6/1993 | Schuler | 318/561 |
| 5,223,776 A | 6/1993 | Radke et al. | 318/568.1 |
| 5,228,356 A | 7/1993 | Chuang | 74/471 XY |
| 5,235,868 A | 8/1993 | Culver | 74/471 |
| 5,237,327 A | 8/1993 | Saitoh et al. | 341/176 |
| 5,240,417 A | 8/1993 | Smithson et al. | |
| 5,254,919 A | 10/1993 | Bridges et al. | 318/560 |
| 5,271,290 A | 12/1993 | Fischer | |
| 5,275,174 A | 1/1994 | Cook | |
| 5,280,276 A | 1/1994 | Kwok | 345/167 |
| 5,293,158 A | 3/1994 | Soma | 345/161 |
| 5,296,846 A | 3/1994 | Ledley | 345/161 |
| 5,296,871 A | 3/1994 | Paley | 345/163 |
| 5,298,890 A | 3/1994 | Kanamaru et al. | 345/157 |
| 5,299,810 A | 4/1994 | Pierce | |
| 5,309,140 A | 5/1994 | Everett | |
| 5,313,230 A | 5/1994 | Venolia et al. | 345/163 |
| 5,317,336 A | 5/1994 | Hall | 345/164 |
| 5,334,027 A | 8/1994 | Wherlock | |
| 5,355,148 A | 10/1994 | Anderson | 345/166 |
| 5,374,942 A | 12/1994 | Gilligan et al. | 345/157 |
| 5,381,080 A | 1/1995 | Schnell et al. | 318/566 |
| 5,389,865 A | 2/1995 | Jacobus et al. | 318/568.11 |
| 5,396,266 A | 3/1995 | Brimhall | 345/161 |
| 5,397,323 A | 3/1995 | Taylor et al. | 606/130 |
| 5,397,865 A | 3/1995 | Park | 178/18 |
| 5,398,044 A | 3/1995 | Hill | 345/145 |
| 5,405,152 A | 4/1995 | Katanics et al. | 273/438 |
| 5,414,337 A | 5/1995 | Schuler | 318/561 |
| 5,429,140 A | 7/1995 | Burdea et al. | 128/774 |
| 5,436,638 A | 7/1995 | Bolas et al. | 345/156 |
| 5,436,640 A | 7/1995 | Reeves | 345/161 |
| 5,451,924 A | 9/1995 | Massimino et al. | 340/407.1 |
| 5,457,479 A | 10/1995 | Cheng | 345/163 |
| 5,466,213 A | 11/1995 | Hogan | |
| 5,473,344 A | 12/1995 | Bacon et al. | 345/163 |
| 5,477,237 A | 12/1995 | Parks | 345/156 |
| 5,491,477 A | 2/1996 | Clark et al. | 341/20 |
| 5,512,919 A | 4/1996 | Araki | 345/156 |
| 5,513,100 A | 4/1996 | Parker et al. | 364/167.01 |
| 5,530,455 A | 6/1996 | Gillick et al. | 345/163 |
| 5,541,379 A | 7/1996 | Kim | 200/566 |
| 5,542,672 A | 8/1996 | Meredith | 463/37 |
| 5,543,821 A | 8/1996 | Marchis et al. | 345/167 |
| 5,547,382 A | 8/1996 | Yamasaki | |
| 5,565,887 A | 10/1996 | McCambridge et al. | 345/145 |
| 5,570,111 A | 10/1996 | Barrett et al. | 345/157 |
| 5,576,727 A | 11/1996 | Rosenberg et al. | 345/179 |
| 5,587,937 A | 12/1996 | Massie et al. | 364/578 |
| 5,589,828 A | 12/1996 | Armstrong | 341/20 |
| 5,589,854 A | 12/1996 | Tsai | 345/161 |
| 5,591,082 A | 1/1997 | Jensen et al. | 463/38 |
| 5,591,924 A | 1/1997 | Hilton | 73/862.043 |
| 5,596,347 A | 1/1997 | Robertson et al. | 345/145 |
| 5,623,582 A | 4/1997 | Rosenberg | 395/99 |
| 5,623,642 A | 4/1997 | Katz et al. | 395/500 |
| 5,625,576 A | 4/1997 | Massie et al. | 364/578 |
| 5,627,531 A | 5/1997 | Posso et al. | 341/22 |
| 5,629,594 A | 5/1997 | Jacobus et al. | 318/568.11 |
| 5,634,794 A | 6/1997 | Hildreth et al. | |
| 5,642,469 A | 6/1997 | Hannaford et al. | 395/99 |
| 5,643,087 A | 7/1997 | Marcus et al. | 463/38 |
| 5,656,901 A | 8/1997 | Kurita | 318/436 |
| 5,666,138 A | 9/1997 | Culver | 345/161 |
| 5,666,473 A | 9/1997 | Wallace | 345/420 |
| 5,691,747 A | 11/1997 | Amano | 345/167 |
| 5,691,898 A | 11/1997 | Rosenberg et al. | 364/190 |
| 5,696,537 A | 12/1997 | Solhjell | 345/164 |
| 5,709,219 A | 1/1998 | Chen et al. | 128/782 |

| | | | |
|---|---|---|---|
| 5,712,725 A | 1/1998 | Faltermeier et al. | 359/392 |
| 5,714,978 A | 2/1998 | Yamanaka et al. | 345/157 |
| 5,721,566 A | 2/1998 | Rosenberg et al. | 345/161 |
| 5,724,068 A | 3/1998 | Sanchez et al. | 345/161 |
| 5,724,106 A | 3/1998 | Autry et al. | 348/734 |
| 5,734,373 A | 3/1998 | Rosenberg et al. | 345/161 |
| 5,736,978 A | 4/1998 | Hasser et al. | 345/173 |
| 5,742,278 A | 4/1998 | Chen et al. | 345/156 |
| 5,745,057 A | 4/1998 | Sasaki et al. | 341/35 |
| 5,745,715 A | 4/1998 | Pickover et al. | 395/348 |
| 5,749,577 A | 5/1998 | Couch et al. | 273/148 |
| 5,754,023 A | 5/1998 | Roston et al. | 318/561 |
| 5,755,577 A | 5/1998 | Gillio | 434/262 |
| 5,757,358 A | 5/1998 | Osga | 345/156 |
| 5,760,764 A | 6/1998 | Martinelli | 345/160 |
| 5,766,016 A | 6/1998 | Sinclair | |
| 5,767,839 A | 6/1998 | Rosenberg | 345/161 |
| 5,771,037 A | 6/1998 | Jackson | 345/157 |
| 5,781,172 A | 7/1998 | Engel et al. | 345/164 |
| 5,784,052 A | 7/1998 | Keyson | |
| 5,785,630 A | 7/1998 | Bobick et al. | |
| 5,787,152 A | 7/1998 | Freadman | 379/67 |
| 5,790,108 A | 8/1998 | Salcudean et al. | 345/184 |
| 5,802,353 A | 9/1998 | Avila et al. | |
| 5,805,140 A | 9/1998 | Rosenberg et al. | 345/161 |
| 5,805,165 A | 9/1998 | Thorne, III et al. | 345/348 |
| 5,808,568 A | 9/1998 | Wu | 341/20 |
| 5,808,601 A | 9/1998 | Leah et al. | 345/145 |
| 5,808,603 A | 9/1998 | Chen | 345/157 |
| 5,816,823 A | 10/1998 | Naimark et al. | 434/307 |
| 5,821,921 A | 10/1998 | Osborn et al. | 345/157 |
| 5,823,876 A | 10/1998 | Unbehand | 463/37 |
| 5,825,308 A * | 10/1998 | Rosenberg | 341/20 |
| 5,828,363 A | 10/1998 | Yaniger et al. | 345/156 |
| 5,831,408 A | 11/1998 | Jacobus et al. | 318/568.11 |
| 5,831,593 A | 11/1998 | Rutledge | 345/156 |
| 5,841,423 A | 11/1998 | Carroll, Jr. et al. | 345/168 |
| 5,841,428 A | 11/1998 | Jaeger et al. | 345/184 |
| 5,844,392 A | 12/1998 | Peurach et al. | 318/568.17 |
| 5,889,506 A | 3/1999 | Lopresti et al. | 345/158 |
| 5,889,670 A | 3/1999 | Schuler et al. | 364/186 |
| 5,889,672 A | 3/1999 | Schuler et al. | 364/188 |
| 5,897,437 A | 4/1999 | Nishiumi et al. | 463/47 |
| 5,912,661 A | 6/1999 | Siddiqui | 345/166 |
| 5,914,705 A | 6/1999 | Johnson et al. | 345/163 |
| 5,944,151 A | 8/1999 | Jakobs et al. | 188/267.1 |
| 5,956,016 A | 9/1999 | Kuenzner et al. | 345/156 |
| 5,959,613 A | 9/1999 | Rosenberg | 345/161 |
| 5,973,670 A | 10/1999 | Barber et al. | 345/157 |
| 5,973,689 A | 10/1999 | Gallery | 345/339 |
| 5,990,869 A | 11/1999 | Kubica et al. | 345/163 |
| 6,001,014 A | 12/1999 | Ogata et al. | 463/37 |
| 6,004,134 A | 12/1999 | Marcus et al. | 434/45 |
| 6,028,593 A | 2/2000 | Rosenberg et al. | |
| 6,061,004 A * | 5/2000 | Rosenberg | 341/20 |
| 6,078,308 A | 6/2000 | Rosenberg et al. | 345/145 |
| 6,088,017 A | 7/2000 | Tremblay et al. | 345/156 |
| 6,097,964 A | 8/2000 | Nuovo et al. | 455/550 |
| 6,100,874 A | 8/2000 | Schena et al. | 345/157 |
| 6,111,577 A | 8/2000 | Zilles et al. | |
| 6,128,006 A * | 10/2000 | Rosenberg et al. | 345/163 |
| 6,154,201 A * | 11/2000 | Levin et al. | 345/184 |
| 6,166,723 A | 12/2000 | Schena et al. | 345/184 |
| 6,184,868 B1 | 2/2001 | Shahoian et al. | 345/161 |
| 6,211,861 B1 | 4/2001 | Rosenberg et al. | 345/163 |
| 6,219,032 B1 | 4/2001 | Rosenberg et al. | 345/157 |
| 6,225,976 B1 | 5/2001 | Yates et al. | 345/156 |
| 6,232,891 B1 | 5/2001 | Rosenberg | 341/20 |
| 6,243,078 B1 | 6/2001 | Rosenberg | 345/161 |
| 6,249,689 B1 | 6/2001 | Aizawa | 455/566 |
| 6,252,579 B1 | 6/2001 | Rosenberg et al. | 345/145 |
| 6,256,011 B1 | 7/2001 | Culver | 345/157 |
| 6,259,382 B1 | 7/2001 | Rosenberg | 341/20 |
| 6,292,174 B1 | 9/2001 | Mallett et al. | 345/163 |
| 6,300,938 B1 | 10/2001 | Culver | 345/156 |
| 6,317,116 B1 | 11/2001 | Rosenberg et al. | 345/145 |
| 6,422,941 B1 | 7/2002 | Thorner et al. | |
| 6,686,911 B1 * | 2/2004 | Levin et al. | 345/184 |
| 7,233,313 B2 * | 6/2007 | Levin et al. | 345/156 |

FOREIGN PATENT DOCUMENTS

| | | |
|---|---|---|
| EP | 0349086 | 1/1990 |
| EP | 0489469 A1 | 6/1992 |
| EP | 626634 A2 | 5/1994 |
| EP | 0607580 A1 | 7/1994 |
| EP | 0663648 A2 | 7/1995 |
| EP | 875819 A1 | 2/1998 |
| JP | H2-185278 | 7/1990 |
| JP | H4-8381 | 1/1992 |
| JP | H5-192449 | 8/1993 |
| JP | H7-24147 | 1/1995 |
| WO | WO92/00559 | 1/1992 |
| WO | WO95/02233 | 1/1995 |
| WO | WO95/20787 | 8/1995 |
| WO | WO95/20788 | 8/1995 |
| WO | WO9520788 | 8/1995 |
| WO | WO95/32459 | 11/1995 |
| WO | WO9532459 | 11/1995 |
| WO | WO96/16397 | 5/1996 |
| WO | WO95/22591 | 7/1996 |
| WO | WO96/42078 | 12/1996 |
| WO | WO97/12357 | 4/1997 |
| WO | WO97/19440 | 5/1997 |
| WO | WO9721160 | 6/1997 |
| WO | WO9731333 | 8/1997 |
| WO | WO00/03319 | 1/2000 |

OTHER PUBLICATIONS

Adelstein et al., "Design and Implementation of a Force Reflecting Manipulandum for Manual Control Research," 1992, NASA Ames Research Center, pp. 1-25.

Akamatsu et al., "Multimodal Mouse: A Mouse-Type Device with Tactile & Force Display," 1994, Presence, vol. 3, p. 73-80.

Atkinson et al., "Computing with Feeling, Computing & Graphics," vol. 2, 1977, p. 97-103.

Batter et al., "Grope 1: A Computer Display to the Sense of Feel," 1971, IFIP Congress, p. 759-763.

Brooks Jr., et al., "Project Grope-Haptic Displays for Scientific Visualization," 1990, Computer Graphics, vol. 24, pp. 177-185.

Buttolo et al., "Pen-Based Force Display for Precision Manipulation in Virtual Environments," 1995, IEEE, pp. 217-224.

Buttolo, Pietro, "Hard Disk Actuators for Mini Teloperation", Proceedings SPIE, Telemanipulator and Telepresence Technologies, Symposium, pp. 55-61, Boston, Oct. 31, 1994.

Colgate et al., "Implementation of Stiff Virtual Walls in Force-Reflecting Interfaces," 1993, Dept. of Mech. Engineering, Northwestern University, pp. 1-7.

Ellis et al., "Design & Evaluation of a High-Performance Prototype Planar Haptic Interface," 1993, ASME, vol. 49, p. 55-64.

Fischer et al., "Specification and Design of Input Devices for Teleoperation," 1990, IEEE CH2876-1, pp. 540-545.

Gotow, J.K. et al., "Perception of Mechanical Properties at the Man-Machine Interface," IEEE CH2503-1/87/0000-0688, 1987, pp. 688-689.

Hannaford et al., "Force Feedback Cursor Control," 1989, NASA Tech Brief, vol. 13, p. 1-4.

Hannaford, Blake et al., "Performance Evaluation of Six-Axis Generalized Force-Reflecting Teleoperator," IEEE May/Jun. 1991, vol. 21, No. 3, pp. 620-633.

Hasser, Christopher John, "Tactile Feedback for a Force-Reflecting Haptic Display," The School of Engineering, University of Dayton, Dec. 1995, pp. iii-xii &1-96.

Hayward et al., "Design & Multi-Objective Optimization of a Linkage for a Haptic Interface," 1994, Advances in Robot Kinematics, p. 359-368.

Hirota et al., "Development of Surface Display," 1993, IEEE 0-7803-1363-1, pp. 256-262.

Howe et al., "Task Performance with a Dextrous Teleoperated Hand System," 1992, SPIE, vol. 1833, pp. 1-9.

Iwata, H., "Artificial Reality with Force-Feedback: Development of Desktop Virtual Space with Compact Master Manipulator," 1990, Computer Graphics, vol. 24, pp. 165-170.

Iwata, Hiroo, "Pen-based Haptic Virtual Environment," Institute of Engineering Mechanics, University of Tsukuba, Japan, pp. 287-292.

Kelley et al., "MagicMouse: Tactile and Kinesthetic Feedback in the Human-Computer Interface using an Electromagnetically Actuated Input/Out Device," 1993, University of Brit. Col., p. 1-27.

Kilpatrick, Paul Jerome, "The Use of a Kinesthetic Supplement in an Interactive Graphics System", The University of North Carolina at Chapel Hill, Ph.D., 1976, Computer Science.

Kim, Won S. et al., A Teleoperation Training Simulator with Visual and Kinesthetic Force Virtual Reality.

Kim, Won S. et al., "Graphics Displays for Operator Aid Telemanipulation," IEEE 1991, pp. 1059-1067.

Kotoku, Tetsuo et al., "Environment Modeling for the Interactive Display (EMID) Used in Telerobotic Systems," IEEE Nov. 3-5, 1991, pp. 99-1004.

Kotoku, Tetsuo, "A Predictive Display with Force Feedback and its Application to Remote Manipulation System with Transmission Time Display," IEEE 1992, Jul. 7-10, 1992, pp. 239-246.

Millman et al., "Design of a Four Degree-of-Freedom Force-Reflecting Manipulandum with a Specified Force/Torque Workspace," 1991, IEEE CH2969-4, pp. 1488-1492.

Minsky et al., "Feeling & Seeing: Issues in Force Display," 1990, ACM 089791-351-5, pp. 235-270.

Munch et al., "Intelligent Control for Haptic Displays," 1996, Eurographics, vol. 15. No. 3, p. C-217-C-226.

Noll, A. Michael, "Man-Machine Tactile Communication Dissertation," Polytechnic Institute of Brooklyn, Jun. 1971, pp. 1-88.

Ouh-young, Ming et al., "Force Display Performs Better than Visual Display in a Simple 6-D Docking Task," IEEE 1989, pp. 1462-1466.

Ouh-Young, Ming, "Force Display in Molecular Docking," Chapel Hill 1990, pp. 1-85.

Payette et al., "Evaluation of a Force Feedback (Haptic) Computer Pointing Device in Zero Gravity," Oct. 17, 1996, ASME Dynamic Systems, vol. 58, p. 547-553.

Ramstein et al., "The Pantograph: A Large Workspace Haptic Device for a Multimodal Human-Computer Interaction," 1994, Computer-Human Interaction CHI '94, pp. 1-3.

Ramstein, Combining Haptic & Braille Technologies: Design Issues & Pilot Study, Apr. 11, 1996, ACM Conf. On Asst. Tech., p. 37-44.

Rosenberg et al., "Commercially Viable Force Feedback Controller for Individuals with Neuromotor Disabilities," 1996, Wright Patterson AFB, pp. 1-33.

Rosenberg et al., "The Use of Force Feedback to Enhance Graphical User Interfaces," 1996, Proc. SPIE 2653, pp. 243-248.

Rosenberg, L., "A Force Feedback Programming Primer," Immersion Corp., 1997, pp. 1-176.

Rosenberg, L., "The Use of Virtual Fixtures to Enhance Operator Performance in Time Delayed Teleoperation," 1993, Wright-Patterson AFB, pp. 1-45.

Rosenberg, Louis B. et al., "Perceptual Decomposition of Virtual Haptic Surfaces," IEEE, Oct. 1993.

Rosenberg, Louis B., "Perceptual Design of a Virtual Rigid Surface Contact," Center for Design Reseach Stanford University, Air Force Material Command, Apr. 1993, pp. 1-41.

Rosenberg, Louis B., "The Use of Virtual Fixtures as Perceptual Overlays to Enhance Operator Performance in Remote Environments," Air Force Material Command, Sep. 1992, pp. 1-42.

Rosenberg, Louis B., "Virtual haptic overlays enhance performance in telepresence tasks", Stanford University, Center for Mechanical Engineering, Stanford, CA 94305.

Russo, "The Design and Implementation of a Three Degree-of-Freedom Force Output Joystick," Dept. of Mech. Engineering, 1990, pp. 8-42.

Schmult et al., "Application Areas for a Force-Feedback Joystick," 1993, Advances in Robotics, Mechatronics, and Haptic Interfaces, vol. 49, pp. 47-54.

Su, S. Augustine et al., "The Virtual Panel Architecture: A 3D Gesture Framework," IEEE 1993, pp. 387-393.

Tan, Hong Z et al., "Manual Resolution of Compliance When Work and Force Cues are Minimized," ASME 1993, DSC-vol. 49, pp. 99-104.

Wiker et al., "Development of Tactile Mice for Blind Access to Computers", 1991, Proceedings of Human Factors Society, pp. 708-712.

Wiker, Steven F. et al., "Development of Tactile Mice for Blind Access to Computers: Importance of Stimulation Locus, Object Size, and Vibrotactile Display Resolution," Proceedings of the Human Factors Society 35th Annual Meeting 1991, pp. 708-712.

Winey III, "Computer Simulated Visual and Tactile Feedback as an Aid to Manipulator and Vehicle control", Massachuetts Institute of Technology, 1981.

Yokokohji, Yasuyoshi, "What You Can See is What You Can Feel-Development of a Visual/Haptic Interface to Virtual Environment", The Robotics Institutr, Carnegie Mellon University, 1996 IEEE, Proceedings of VRAIS'96.

"Taking a Joystick Ride", Computer Currents, Tim Scannell, Nov. 1994, Boston Edition, vol. 9, No. 11.

"Coaxial Control Shaker Part No. C-25502," Safe Flight Instrument Corporation, 26 pages, Jul. 1, 1967; Revised Jan. 28, 2002.

Baigrie, "Electric Control Loading—A Low Cost, High Performance Alternative," Proceedings, pp. 247-254, Nov. 6-8, 1990.

Iwata, "Pen-based Haptic Virtual Environment," 0-7803-1363-1/93 IEEE, pp. 287-292, 1993.

Russo, "The Design and Implementation of a Three Degree of Freedom Force Output Joystick," MIT Libraries Archives Aug. 14, 1990, pp. 1-131, May 1990.

Brooks et al., "Hand Controllers for Teleoperation—A State-of-the-Art Technology Survey and Evaluation," JPL Publication 85-11; NASA-CR-175890; N85-28559, pp. 1-84, Mar. 1, 1985.

Jones et al., "A perceptual analysis of stiffness," ISSN 0014-4819 Springer International (Springer-Vertag); Experimental Brain Research, vol. 79, No. 1, pp. 150-156, 1990.

Burdea et al., "Distributed Virtual Force Feedback, Lecture Notes for Workshop on Force Display in Virtual Environments and its Application to Robotic Teleoperation," 1993 IEEE International Conference on Robotics and Automation, pp. 25-44, May 2, 1993.

Snow et al., "Model-X Force-Reflecting-Hand-Controller," NT Control No. MPO-17851; JPL Case No. 5348, pp. 1-4, Jun. 15, 1989.

Ouh-Young, "Force Display in Molecular Docking," Order No. 9034744, p. 1-369, 1990.

Tadros, Control System Design for a Three Degree of Freedom Virtual Environment Simulator Using Motor/Brake Pair Actuators, MIT Archive© Massachusetts Institute of Technology, pp. 1-88, Feb. 1990.

Caldwell et al., "Enhanced Tactile Feedback (Tele-Traction) Using a Multi-Functional Sensory System," 1050-4729/93, pp. 955-960, 1993.

Adelstein, "Design and Implementation of a Force Reflecting Manipulandum for Manual Control research," DSC-vol. 42, Advances in Robotics, Edited by H. Kazerooni, pp. 1-12, 1992.

Gotow et al, "Controlled Impedance Test Apparatus for Studying Human Interpretation of Kinesthetic Feedback," WA11-11:00, pp. 332-337.

Stanley et al., "Computer Simulation of Interacting Dynamic Mechanical Systems Using Distributed Memory Parallel Processors," DSV-vol. 42, Advances in Robotics, pp. 55-61, ASME 1992.

Russo, "Controlling Dissipative Magnetic Particle Brakes in Force Reflective Devices," DSC-vol. 42, Advances in Robotics, pp. 63-70, ASME 1992.

Kontarinis et al., "Display of High-Frequency Tactile Information to Teleoperators," Telemanipulator Technology and Space Telerobotics, Wan S. Kim, Editor, Proc. SPIE vol. 2057, pp. 40-50, Sep. 7-9, 1993.

Patrick et al., "Design and Testing of A Non-reactive, Fingertip, Tactile Display for Interaction with Remote Environments," Cooperative Intelligent Robotics in Space, Rui J. deFigueiredo et al., Editor, Proc. SPIE vol. 1367, pp. 215-222, 1990.

Adelstein, "A Virtual Environment System For The Study of Human Arm Tremor," Ph.D. Dissertation, Dept. of Mechanical Engineering, MIT, Jun. 1989.

Bejczy, "Sensors, Controls, and Man-Machine Interface for Advanced Teleoperation," Science, vol. 208, No. 4450, pp. 1327-1335, 1980.

Bejczy, "Generation of Bilateral Force-Reflecting Control of Manipulators," Proceedings Of Fourth CISM-IFToMM, Sep. 8-12, 1981.

McAffee, "Teleoperator Subsystem/Telerobot Demonsdtrator: Force Reflecting Hand Controller Equipment Manual," JPL D-5172, pp. 1-50, A1-A36, B1-B5, C1-C36, Jan. 1988.

Minsky, "Computational Haptics: The Sandpaper System for Synthesizing Tecture for a Force-Feedback Display," Ph.D. Dissertation, MIT, Jun. 1995.

Jacobsen et al., "High Performance, Dextrous Telerobotic Manipulator With Force Reflection," Intervention/ROV '91 Conference & Exposition, Hollywood, Florida, May 21-23, 1991.

Shimoga, "Finger Force and Touch Feedback Issues in Dexterous Telemanipulation," Proceedings of Fourth Annual Conference on Intelligent Robotic Systems for Space Exploration, Rensselaer Polyechnic Institute, Sep. 30-Oct. 1, 1992.

IBM Technical Disclosure Bullein, "Mouse Ball-Actuating Device With Force and Tactile Feedback," vol. 32, No. 9B, Feb. 1990.

Terry et al., "Tactile Feedback In A Computer Mouse," Proceedings of Fourteenth Annual Northease Bioengineering Conference, University of New Hampshire, Mar. 10-11, 1988.

Howe, "A Force-Reflecting Teleoperated Hand System for the Study of Tactile Sensing in Precision Manipulation," Proceedings of the 1992 IEEE International Conference on Robotics and Automation, Nice, France, May 1992.

Eberhardt et al., "Omar—A Haptic display for speech perception by deaf and def-blind individuals," IEEE Virtual Reality Annual International Symposium, Seattle, WA, Sep. 18-22, 1993.

Rabinowitz et al., "Multidimensional tactile displays: Identification of vibratory intensity, frequency, and contractor area," Journal of The Accoustical Society of America, vol. 82, No. 4, Oct. 1987.

Bejczy et al., "Kinesthetic Coupling Between Operator and Remote Manipulator," International Computer Technology Conference, The American Society of Mechanical Engineers, San Francisco, CA, Aug. 12-15, 1980.

Bejczy et al., "A Laboratory Breadboard System For Dual-Arm Teleoperation," Soar '89 Workshop, JSC, Houston, TX, Jul. 25-27, 1989.

Ouh-Young, "A Low-Cost Force Feedback Joystick and Its Use in PC Video Games," IEEE Transactions on Consumer Electronics, vol. 41, No. 3, Aug. 1995.

Marcus, "Touch Feedback in Surgery," Proceedings of Virtual Reality and Medicine The Cutting Edge, Sep. 8-11, 1994.

Bejczy, et al., "Universal Computer Control System (UCCS) For Space Telerobots," CH2413-3/87/0000/0318501.00 1987 IEEE, 1987.

Aukstakalnis et al., "Silicon Mirage: The Art and Science of Virtual Reality," ISBN 0-938151-82-7, pp. 129-180, 1992.

Eberhardt et al., "Including Dynamic Haptic Perception by The Hand: System Description and Some Results," DSC-vol. 55-1, Dynamic Systems and Control: vol. 1, ASME 1994.

Gobel et al., "Tactile Feedback Applied to Computer Mice," International Journal of Human-Computer Interaction, vol. 7, No. 1, pp. 1-24, 1995.

Pimentel et al., "Virtual Reality: through the new looking glass," 2nd Edition; McGraw-Hill, ISBN 0-07-050167-X, pp. 41-202, 1994.

"Cyberman Technical Specification," Logitech Cyberman Swift Supplement, Apr. 5, 1994.

Ouhyoung et al., "The Development of A Low-Cost Force Feedback Joystick and Its Use in the Virtual Reality Environment," Proceedings of the Third Pacific Conference on Computer Graphics and Applications, Pacific Graphics '95, Seoul, Korea, Aug. 21-24, 1995.

Kaczmarek et al., "Tactile Displays," Virtual Environment Technologies.

\* cited by examiner

CONTROL KNOB WITH MULTIPLE DEGREES OF FREEDOM AND FORCE FEEDBACK

CROSS-REFERENCES TO RELATED APPLICATION

This application is a continuation of patent application Ser. No. 10/712,199, filed Nov. 13, 2003, now U.S. Pat. No. 7,233,313 entitled "Control Knob with Multiple Degrees of Freedom and Force Feedback", which is a continuation of patent application Ser. No. 09/680,408, filed Oct. 2, 2000, now U.S. Pat. No. 6,686,911 entitled "Control Knob with Control Modes and Force Feedback", which is a continuation-in-part of parent patent application Ser. No. 09/049,155, filed Mar. 26, 1998, now U.S. Pat. No. 6,128,006 entitled, "Force Feedback Mouse Wheel," and Ser. No. 09/087,022, filed May 29, 1998, now U.S. Pat. No. 6,061,004 entitled, "Force Feedback Interface Having Isotonic and Isometric Functionality", which is a divisional application Ser. No. 08/756,745 of U.S. Pat. No. 5,825,308, filed Nov. 26, 1996, all assigned to the assignee of the present application, and all of which are incorporated herein by reference.

BACKGROUND

This invention relates generally to knob control devices, and more particularly to control knob devices including force feedback and additional input functionality.

Control knobs are used for a variety of different functions on many different types of devices. Often, rotary control knobs offer a degree of control to a user that is not matched in other forms of control devices, such as button or switch controls. For example, many users prefer to use a rotating control knob to adjust the volume of audio output from a stereo or other sound output device, since the knob allows both fine and coarse adjustment of volume with relative ease, especially compared to button controls. Both rotary and linear (slider) knobs are used on a variety of other types of devices, such as kitchen and other home appliances, video editing/playback devices, remote controls, televisions, etc. Some control knobs have been provided with "force feedback." Force feedback devices can provide physical sensations to the user manipulating the knob. Typically, a motor is coupled to the knob and is connected to a controller such as a microprocessor. The microprocessor receives sensor signals from the knob and sends appropriate force feedback control signals to the motor so that the motor provides forces on the knob. In this manner, a variety of programmable feel sensations can be output on the knob, such as detents, spring forces, or the like.

One problem occurring in control knobs of the prior art is that the knobs are limited to basic rotary motion. This limits the control options of the user to a simple, one-degree-of-freedom device that does not allow a variety of selection options. In additions if force feedback is provided on the knob, the limited control functionality of the knob limits the user from fully taking advantage of the force feedback to provide more control over desired functions.

SUMMARY

The present invention provides a knob control interface that allows a user to control functions of a device in a variety of ways. Embodiments of the knob controller include additional degrees of freedom for the knob and force feedback applied to the knob.

More particularly, in one embodiment a knob controller device of the present invention includes a knob coupled to a grounded surface. The knob is rotatable in a rotary degree of freedom about an axis extending through the knob, and the knob also moveable in a transverse direction approximately perpendicular to the axis. A rotational sensor detects a position of the knob in the rotary degree of freedom, and a transverse sensor detects a position of the knob in the transverse direction. An actuator is coupled to the knob to output a force in the rotary degree of freedom about the axis, thus providing force feedback. In a preferred embodiment, the knob is moveable in multiple transverse directions. For example, the transverse sensor includes a switch that detects when the knob is moved in a transverse direction; the switch can be a hat switch halving multiple individual switches, for example. In one embodiment, the knob is moveable in four transverse directions spaced approximately orthogonal to each other.

Furthermore, a local microprocessor can be included to control the force feedback on the knob. The microprocessor receives sensor signals from the rotary and transverse sensors and controls a function of a device in response to the sensor signals. The device can be any of a variety of electrical or electronic types of devices. The device can also include a display, wherein an image on said display is changed in response to manipulation of the knob in the transverse direction. A method of the present invention for controlling functions of a device from input provided by a knob similarly uses sensor signals from a rotary sensor and a transverse sensor to control at least one function of a device, such as adjusting a frequency of a radio tuner or updating a displayed image based on at least one of the sensor signals.

In another aspect of the present invention, a knob is coupled to a grounded surface, where the knob is rotatable in a rotary degree of freedom about an axis extending through the knob. The knob is also moveable in a linear degree of freedom approximately parallel to the axis. A rotational sensor and a linear sensor detect positions of the knob in the respective degrees of freedom. An actuator is also coupled to the knob and operative to output a force in the rotary degree of freedom about the axis, thereby providing force feedback to the knob. The linear degree of freedom of the knob allows it to be pushed and/or pulled by the user, where the push or pull motion is detected by the linear sensor. A spring member is preferably included for biasing the knob to a center position in the linear degree of freedom. The linear sensor can, for example, include a grounded switch that is contacted by a pusher member coupled to the knob when the knob is moved in the linear degree of freedom. Alternatively, the linear sensor can detect a position of the knob within a detectable continuous range of motion of the knob. The transverse degree of freedom of the previous embodiment of the knob can also be included. A microprocessor preferably receives the sensor signals and controls a function of a device in response to the sensor signals, and also sends force feedback signals to the actuator to control forces output by the actuator.

In a different aspect of the present invention, a method for providing detent forces for a force feedback control includes outputting a first force by an actuator on a user manipulatable object, such as a rotary knob, for a first detent when the user object is moved within a range of the first detent. The first force assists movement of the user object toward an origin position of the first detent and resists movement away from the origin position. A second force for a second detent is also output on the user object when the user object is moved within a range of the second detent, similar to the first force. A portion of the range of the first detent overlaps a portion of the range of the second detent. The overlapped portions of the ranges preferably modifies the second force such that a force at the beginning point of the second detent range has less magnitude than a force at an endpoint of the second detent range. Preferably, the first force and second force each have a magnitude that increases the further that the user object is positioned from that detent's origin. Preferably, the direction of the knob changes the range endpoint magnitudes Such that if the knob is moved in the opposite direction, the first-encountered point of the first detent range has a lesser magnitude than the last-encountered point.

In another aspect of the present invention, a method for providing detent forces for a force feedback control includes defining a periodic wave and using at least a portion of the periodic wave to define a detent force curve. The detent force curve defines a force to be output on a user manipulatable object, such as a rotary knob, based on a position of the user manipulatable object in a degree of freedom. The detent force curve is then used to command the force on the user manipulatable object as output by an actuator. The type, period and magnitude can be specified for the periodic wave. The detent force curve can be defined by specifying a portion of said periodic wave to be the width of the detent force curve, specifying a phase and an offset to be applied to said periodic wave to define the detent force curve, and/or specifying an increment distance between successive detents.

The apparatus and method of the present invention provide a control knob for a device that includes greater control functionality for the user. The lineal and transverse degrees of freedom of the knob allow the user to select functions, settings, modes, or options with much greater case and without having to take his or her hand off the knob. Force feedback may also be added to the knob to provide the user with greater control and to inform the user of options and selections through the sense of touch. Force feedback detent implementations of the present invention provide overlapping detent ranges to allow more accurate control of a knob by a user within closely-spaced detents, and an efficient, convenient method for defining detents from periodic waves.

These and other advantages of the present invention will become apparent to those skilled in the art upon a reading of the following specification of the invention and a study of the several figures of the drawing.

BRIEF DESCRIPTION OF THE DRAWINGS

FIG. 3b is a side elevational view of the embodiment of FIG. 3a;

FIG. 4b is a top plan view of a unitary plate used in the embodiment of FIG. 4a;

FIG. 4c is a side elevational view of the embodiment of FIG. 4a;

DETAILED DESCRIPTION

Figure 1:
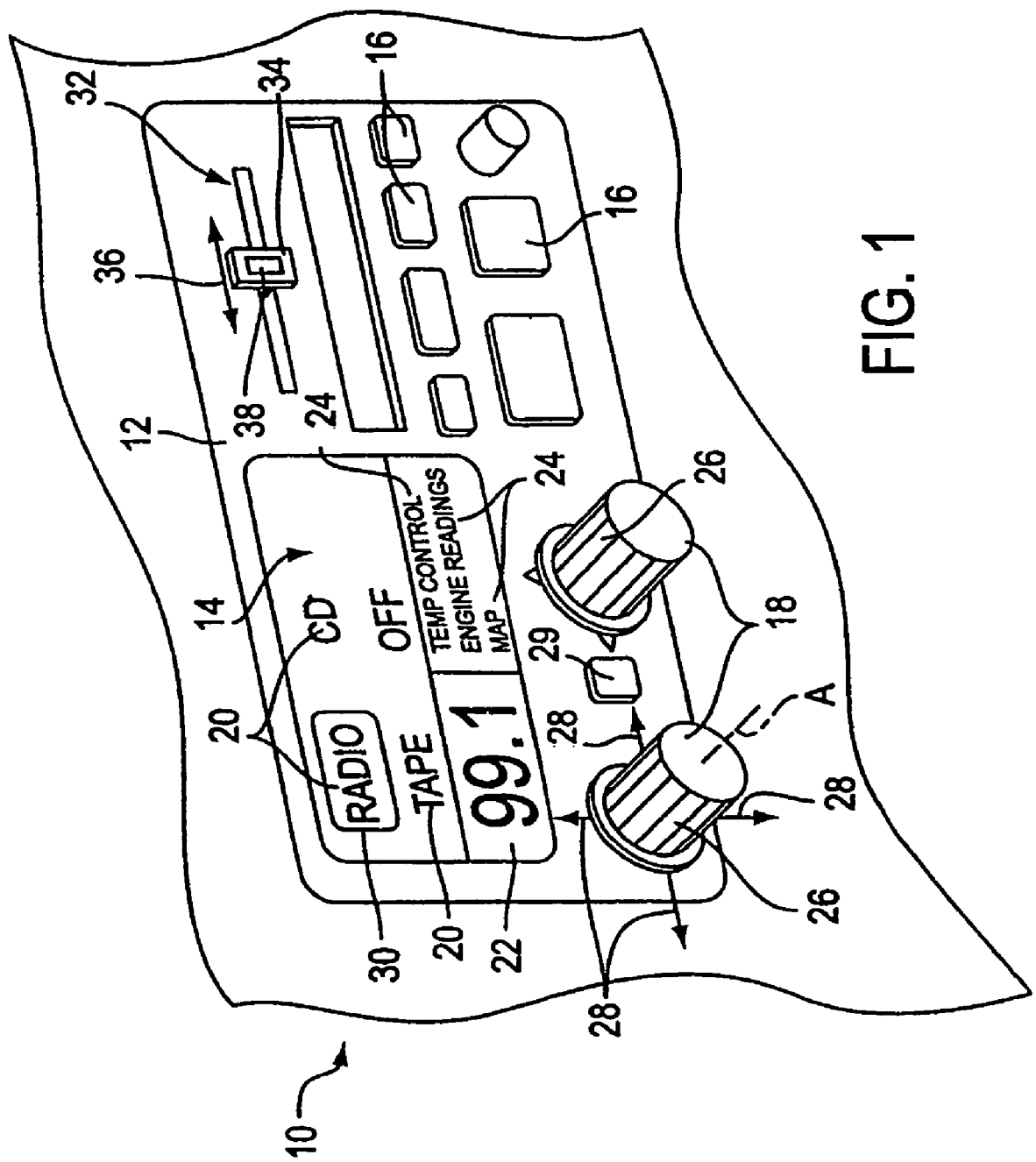
FIG. 1 is a perspective view of one embodiment of a device including a control knob of the present invention.

FIG. 1 is a perspective view of an example of a control panel 12 for a device 10 including a control knob of the present invention. In the described embodiment, device 10 is an audio device that controls the output of sound, such as music or speech, from speakers that are connected to the device 10. For example, a common embodiment of device 10 is a stereo system that includes the ability to play sound from one or more media or signals, such as cassette tapes, digital audio transmission (DAT) tapes, compact discs (CD's) or other optical discs, or radio signals transmitted through the air from a broadcasting station.

The device 10 can also include additional or other functionality not related to audio control and output. For example, many vehicles include electronic systems to control the temperature in the vehicle cabin (air conditioning, heat, etc.), as well as systems to provide information on the current operating characteristics of the vehicle, such as current speed, engine temperature, fuel or other fluid levels, whether windows of the vehicle are open, etc. Other systems may include a navigation system that displays a map and the current location of the vehicle with respect to the map, a cellular telephone or other portable telephone control system, and a security/alarm system. Device 10 can include the ability to display information from and/or influence such other systems in a vehicle or other environment, such as a house, office, etc.

Alternatively, device 10 can be a variety of other electronic or computer devices. For example, device 10 can be a home appliance such as a television set, a microwave oven or other kitchen appliances, a washer or dryer, a home stereo component or system, a home computer, a set top box for a television, a video game console, a remote control for any device, a controller or interface device for a personal computer or console games, a home automation system (to control such devices as lights, garage doors, locks, appliances, etc.), a telephone, photocopier, control device for remotely-controlled devices such as model vehicles, toys, a video or Film editing or playback system, etc. Device 10 can be physically coupled to the control panel 12, or the panel 12 can be physically remote from the device 10 and communicate with the device using signals transferred through wires, cables, wireless transmitter/receiver, etc.

Device 10 preferably includes a front panel 12, a display 14, several control buttons 16, and one or more control knobs 18 of the present invention. Front panel 12 can be mounted, for example, on the interior of a vehicle, such as on or below the dashboard, or in some other convenient area. Alternatively, the front panel 12 can be the surface of the external housing of the device 10 itself, such as a stereo unit. The device 10 may include several functions, such as playing an audio track, adjusting volume, tone, or balance of an audio output, displaying all image (icons, a map, etc.), or adjusting the temperature or fan speed in a vehicle, which can be changed or set by the user manipulating the controls of the device 10 on front panel 12.

Display 14 is provided to show information to the user regarding the controlled device or system and/or other systems connected to the device 10. For example, options 20 can be displayed to indicate which function of the device 10 is currently selected. Such options can include "radio," "tape,"

"CD," or power, as shown. Other information, such as the current radio frequency 22 selected for a radio tuner, can also be displayed. Furthermore, any information related to additional functionality of the device 10 can also be displayed. For example, information 24 can be provided to allow the user to select one or more functions not related to the audio operation of the device 10. In some embodiments, a map or similar graphical display can be shown on display 14 of all device 10 to allow the user to navigate. Some examples of functions displayed by a display 14 are shown with respect to FIG. 2, below. In other embodiments, display 14 can be a separate monitor displaying a graphical user interface or other graphical environment as controlled by a host computer. Display 14 can be any suitable display device, such as an LED display, LCD display, gas plasma display, CRT, or other device. In some embodiments, display 14 can include a touch-sensitive surface to allow a user to touch displayed images directly on the display 14 to select those images and an associated setting or function.

Control buttons 16 are often provided on device 10 to allow the user to select different functions or settings of the device. For example, on an audio device, buttons 16 can include radio station preset buttons, rewind/fast forward tape functions, power, speaker loudness, etc. Virtually any function of the device can be assigned to buttons 16. The buttons 16 may also be used in conjunction with the control knobs 18, as described below.

Control knobs 18 are provided to allow the user a different type of control of functions and settings of device 1I than the buttons 16 allow. Knobs 18, in the described embodiment, are approximately cylindrical objects engageable by the user. The knobs 18 can alternatively be implemented as a variety of different objects, including conical shapes, spherical shapes, dials, cubical shapes, rods, etc., and may have a variety of different textures on their circumferential surfaces, including bumps, lines, or other gripe, or even projections or members extending from the circumferential surface. In addition, any of variety of differently-sized knobs can be provided; for example, if high-magnitude forces are output, a larger-diameter cylindrical knob is often easier for a user to interface with device 10. In the described embodiment, each knob 18 rotates in a single rotary degree of freedom about an axis extending out of the knob, such as axis A. The user preferably grips or contacts the circumferential surface 26 of the knob 18 and rotates it a desired amount. Force feedback can be provided in this rotary degree of freedom in some embodiments, as described in greater detail with reference to FIGS. 3a and 3b.

Furthermore, the control knobs 18 of the present invention allow additional control functionality for the user. The knobs 18 are preferably able to be moved by the user in one or more directions approximately perpendicular to the axis A of rotation, e.g. parallel to the surface of the front panel 12 as shown in FIG. 1 ("transverse motion" or "transverse direction"). This transverse motion is indicated by arrows 28. For example, the knob 18 can be moved in the four orthogonal directions shown, or may be moveable in less or more directions in other embodiments, e.g. only two of the directions shown, or in eight directions spaced at 45 degree intervals about axis A. In one embodiment, each transverse direction of the knob is spring loaded such that, after being moved in a direction 28 and once the user releases or stops exerting sufficient force on the knob, the knob will move back to its centered rest position. In other embodiments, the knob can be provided without such a spring bias so that the knob 18 stays in any position to which it is moved until the user actively moves it to a new position.

This transverse motion of knob 18 can allow the user to select additional settings or functions of the device 10. In some embodiments, the additional control options provided by knob 18 allow the number of buttons 16 and other controls to be reduced, since the functions normally assigned to these buttons can be assigned to the knob 18. For example, the user can move a cursor 30 or other visual indicator on display 14 (e.g. pointer, selection box, arrow, or highlighting of selected text/image) to a desired selection on the display. Thus, the cursor 30 can be moved from the "radio" selection shown to the "tape" selection by moving the knob 28 in the down direction as shown in FIG. 1. Or, the cursor 30 can be moved to the "CD" selection by moving the knob 28 in the direction to the right. If knob 18 is provided with diagonal directions (e.g. at 45 degree intervals), the user can move the cursor 30 from the "radio" selection directly to the "off" selection. The user can similarly move cursor 30 or a different indicator to the other information settings 24, to the frequency display 22, or to any other displayed option, setting, or area/region on the display 14.

Besides such a cursor positioning mode, the transverse motion of knob 28 can also directly control values or magnitudes of settings. For example, the left motion of knob 18 can decrease the radio station frequency value 22, where the value can (decrease at a predetermined rate if the user continually holds the knob 18 in the left direction. The right motion of the knob 18 can similarly increase the frequency value 22. In another example, once one of the information settings 24 is selected, a sub menu can be displayed and the directions 28 of knob 18 can adjust air temperature, a timer, a cursor on a displayed map, etc.

Different modes can also be implemented; for example, the default mode allows the user to control cursor 30 using the directions 28 of the knob. Once the cursor is located at a desired setting, such as the frequency value 22, the user can switch the mode to allow the directions 28 to control the setting itself, such as adjusting the value 22. To switch modes, any suitable control can be used. For example, the user can push a button, such as button 29, to toggle a mode. Alternatively, the user can push or pull the knob 18 to select the mode; this functionality of the present invention is described below. Or, some or all of the directions 28 can be used to select modes; for example, the down direction might switch to "volume" mode to allow the user to rotate the knob to adjust volume; the up direction can switch to "adjust radio frequency" mode, and the left direction can switch to "balance" mode (for adjusting the speaker stereo balance for audio output with rotation of knob 18).

In addition, the control knobs 18 are preferably able to be pushed and/or pulled in a degree of freedom along axis A (or approximately parallel to axis A). This provides the user with additional ways to select functions or settings without having to remove his or her grip from the knob. For example, in one preferred embodiment, the user can move cursor 30 or other indicator on the display 14 using the directions 28 of the knob 18; when the cursor has been moved to a desired setting or area on the display, the user can push the knob 18 to select the desired setting, much like a mouse button selects all icon in a graphical user interface of a computer. Or, the push or pull function can be useful to control the modes discussed above, since the user can simply push the knob and rotate or move the knob while it is in the pushed mode, then release or move back the knob to select the other mode. The modes discussed above can also be toggled by pushing or pulling the knob 18. The push and/or pull functionality of the knob 18 can be provided with a spring return bias, so that the knob returns to its rest position after the use releases the knob. Alternatively, the knob can be implemented to remain at a pushed or pulled position until the user actively moves the knob to a new position.

A slider control 32 of the present invention may also be included in device 10. Slider control 32 includes a slider knob 34 which is grasped by the user and moved in a linear direction as shown by arrow 36. In the present invention, slider control 32 preferably includes force feedback functionality. Thus, as the user moves the knob 34, force sensations such as a spring force, a damping force, jolts, detents, textures, or other forces can be output and felt by the user. Furthermore, the slider knob 34 can include a button 38 which can be pressed by the user similarly to the push knob embodiment discussed above with reference to knob 18. Alternatively, the knob 34 can be pushed and/or pulled similarly to the knob 18 as described above. Slider control 32 can control any of the various functions, settings, or options of the device 10. For example, the motion left or right of knob 34 can control the radio frequency 22, where force detents are output for each station and/or each preset station previously programmed by the user. Or, the cursor 30 can be moved using the slider knob 34, such that when the cursor reaches a desired setting or selection, the user can push button 38 or push on the knob 34 to select that setting. Other functions such as volume, balance, tone, map functions, temperature functions, or mode selection can also be controlled by the slider control 32. Slider control is described in greater detail with respect to FIG. 5.

Figure 2:
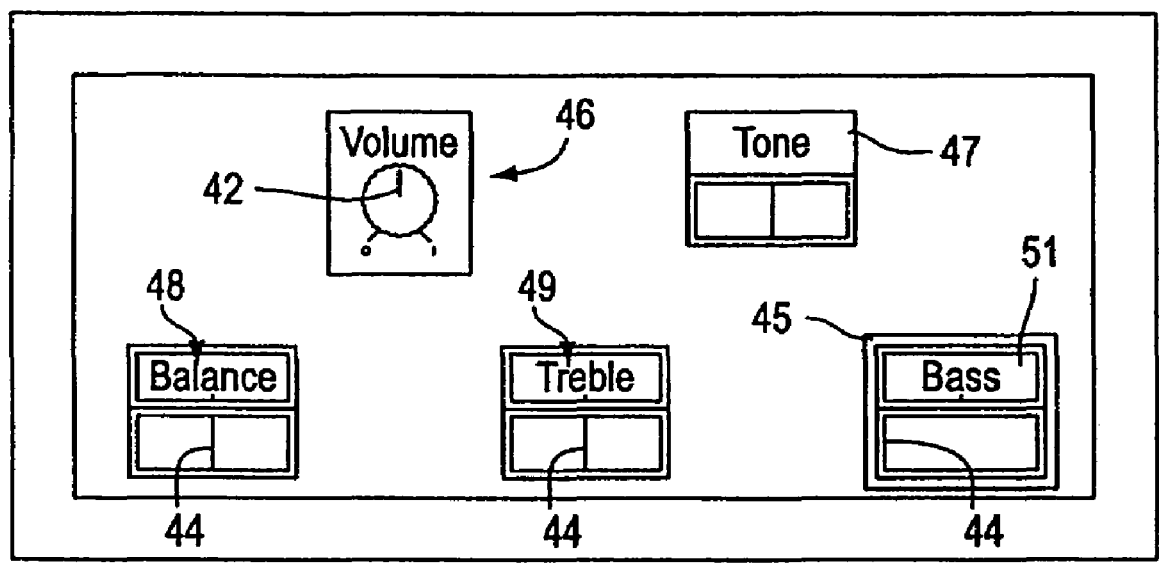
FIG. 2 is a diagrammatic view of a display allowing the user to use the knob of the present invention to select features of the device.

FIG. 2 is an example showing images which can be displayed on display 14 to assist the user in selecting options with knobs 18 and/or slider control 32. Display 14 can present icons as shown, in this example for the control of audio output signals from device 10. Icon 46 is selected to control the volume of the audio output using knob 18, where the circular pointer 42 can be moved in accordance with the knob 18. Icon 47 is used to control the frequency of the radio tuner (the current selected frequency can be displayed as well), and the icons 48, 49, and 51 are used to control the balance, treble, and bass of the audio, respectively. For example, the indicator 44 can be moved left or right depending on the current setting. Cursor 45 is used to select one of the icons to allow the control of the functions associated with the selected icon. Cursor 45 indicates which of the icons in display 14 are currently selected. The icon can be moved from each icon to the next by rotating the knob 18. Alternatively, the transverse motion of the knob can move the cursor 45. A function of the device designed by the selected icon can be selected by pushing the knob 18 in the linear direction. The cursor can be a square or other-shaped box, or the currently-selected icon can be highlighted to indicate the cursor's location.

It should be noted that each of the icons can preferably be set to a position control mode or to a rate control mode as desired by the user. For example, the user may select position control for volume 46 and rate control for the functions of icons 47, 48, 49, and 51, or any other combination. In position control mode, force detents are preferably output to indicate particular settings or how far the knob 18 has been rotated. In rite control mode, detents can also be output. For example, the user maintains the knob 18 at a rotary position away from the center position in opposition to a spring return force, and a detent force (e.g., jolt) is output to indicate how much a particular value has been changed. For example, a jolt can be output for each 10 MHz of frequency that is increased, or for each particular amount of treble or bass that has been adjusted.

Other icons can be displayed in other embodiments. For example, an for vent location can be selected using cursor 45 to determine which vents in the car provide air flow, where a top vent, a bottom vent, or both top and bottom vents can be selected. A fan speed icon can be selected to choose a fan speed setting for the air flow from the vents in the car. In a preferred force feedback implementation, once the fan speed icon has been selected by pushing in the knob 18, the user may rotate the knob 18 to select the fan rotation speed in a position control mode. A small vibration can be output on the knob 18 in the rotary degree of freedom, where the frequency (or magnitude) of the vibration forces correlate with the magnitude of fan rotation speed, i.e., a high fan speed provides a fast vibration. Furthermore, detents are preferably output superimposed on the vibration forces so that the user can feel the fan settings at the detents. This allows the user to select fan speed based purely on tactile feel, so that the driver need not look at the display 14. A temperature icon can be selected to adjust the temperature in the car. The temperature can preferably be adjusted by rotating knob 18, where force detents indicate each temperature setting. Icons for moving mechanical components, such as seats or mirrors, can be provided, where a rate control force mode is used to control the position of the components.

Figure 3A:
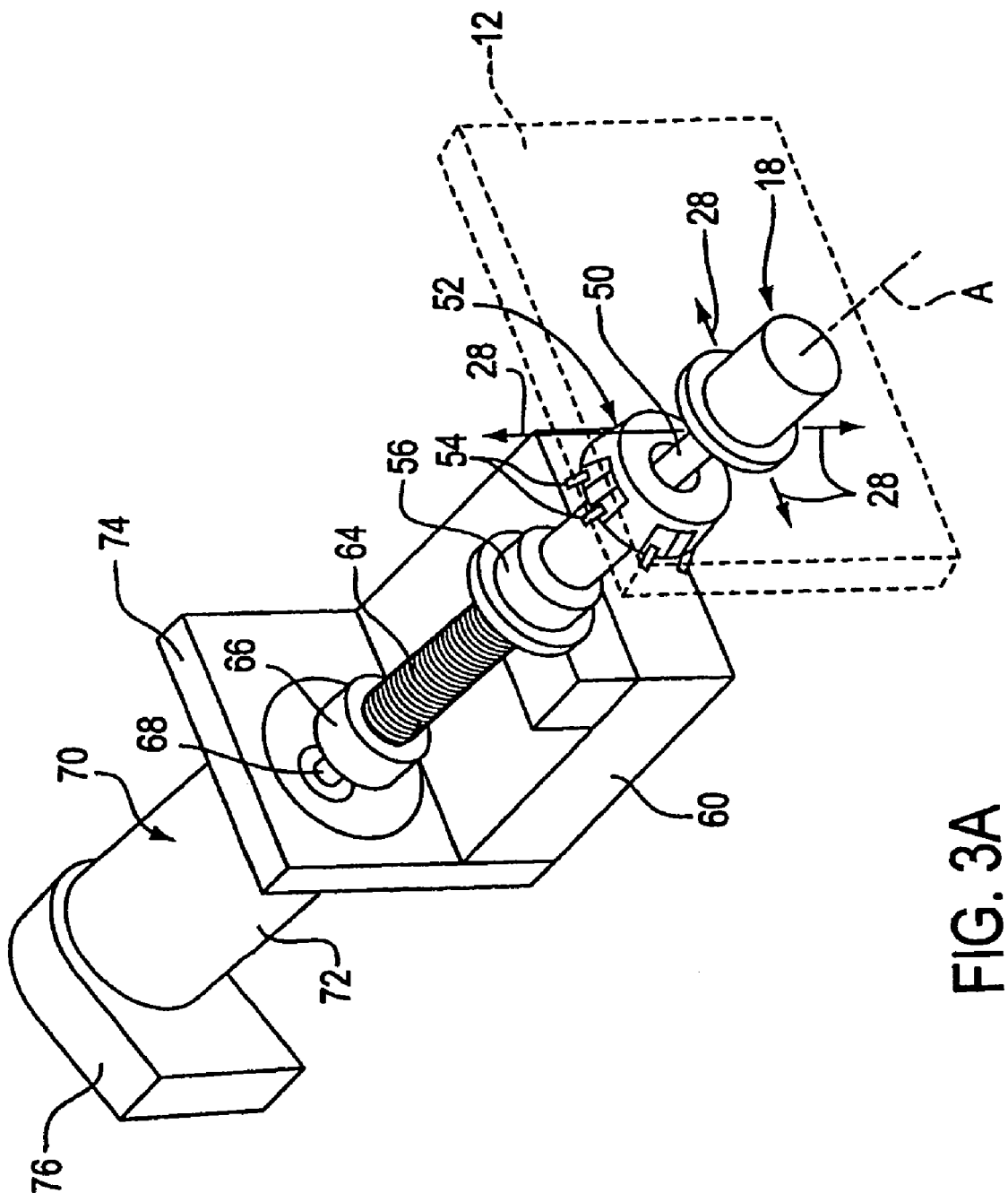
FIG. 3a is a perspective view of one embodiment of the mechanism for implementing the control knob of the present invention.
Figure 3B:
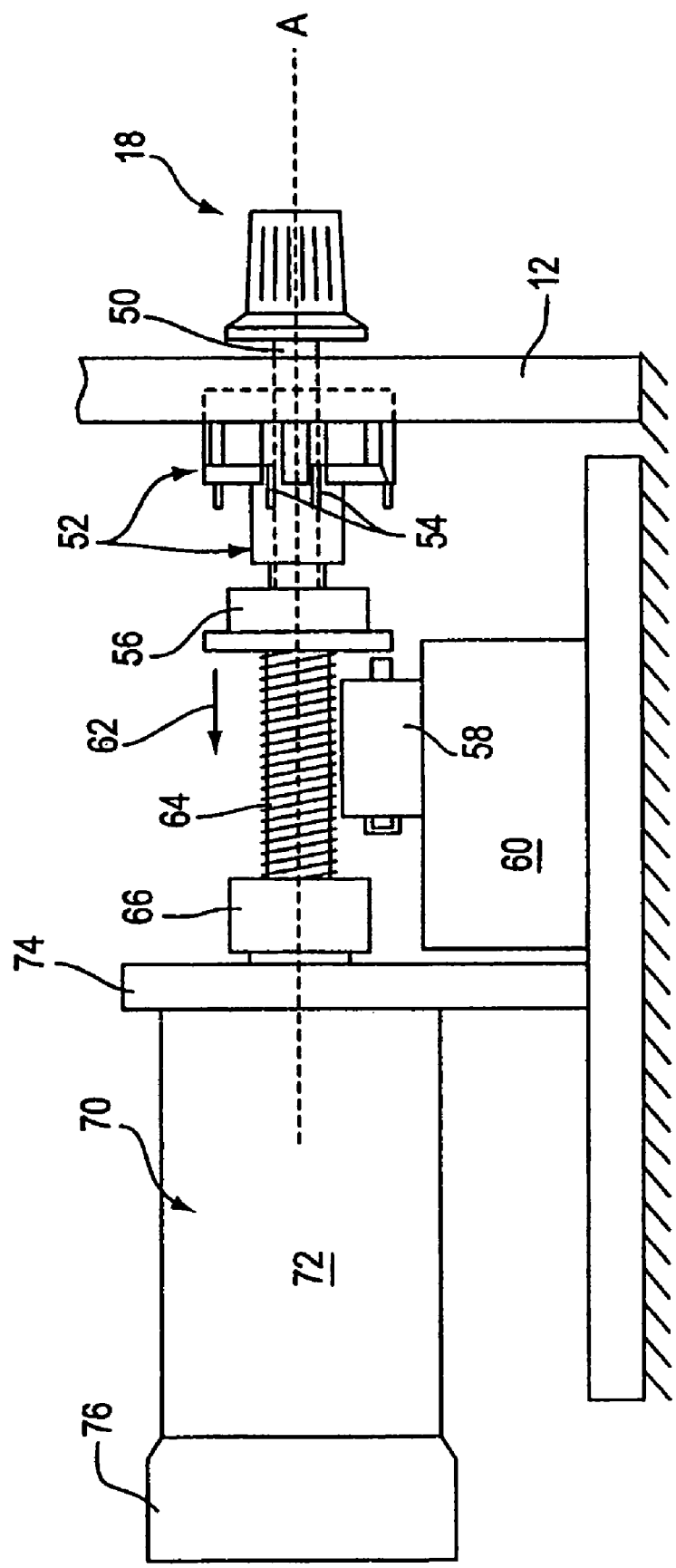

FIG. 3a is a perspective view and FIG. 3b is a side elevational view of one implementation of control knob 18 of the present invention. In this implementation, knob 18 includes the ability to move transversely in four directions, and the knob 18 can also be pushed for additional selection ability.

Knob 18 is rigidly coupled to a rotatable shaft 50 which extends through the grounded front panel 12 (shown in dashed lines). Shaft 50 extends through a four-way switch 52 which detects the transverse motion of the knob 18 in directions 28. The knob 18 is biased toward the centered rest position within switch 52 by a spring member 64, described in greater detail below. When the shaft 50 is moved in any of the provided transverse directions, a corresponding micro switch (not shown) included on the interior sidewall of the four-way switch 52 is closed, thus causing a signal to be output on leads 54. Thus, switch 52 preferably includes individual micro switches, one for each provided transverse direction (four individual switches in the described embodiment). A suitable switch for use as switch 52 is a "hat switch" which is commonly provided for analog joystick controllers for personal computers and allows 4 or 8 directions to a moveable member. For example, joystick hat switches manufactured by such companies as CH Products, Inc. or Logitech can be used. In other embodiments, two-way, eight-way, or other types of switches can be used, depending on how many directions are desired.

A pusher member 56 is rigidly coupled to shaft 50 next to the switch 52. Since the switch 52 includes an aperture through which the shaft 50 extends, the knob 18, shift 50 and pusher member 56 are operative to move as a unit along axis A with respect to the front panel (ground) and the switch 52. A switch 58 (see FIG. 3b) is coupled to a grounded member 60 and is provided in the path of the pusher member 56. Thus, when the knob 18 is pushed by the user, the shaft 50 and the pusher member 56 are moved along axis A in a direction indicated by arrow 62 (see FIG. 3b). This causes pusher member 56 to engage the button 64 of the switch 58, causing the button 64 to be pushed inward and close (or open) the switch. The pushing motion of the knob 18 is thus sensed.

In other embodiments, a sensor can be provided to sense a range of positions of the knob 18 or a continuous motion of the knob 18 linearly along axis A. For example, a Hall effect switch can be provided on pusher member 56 which measures the position of the pusher member 56 relative to a grounded magnet on member 60 (or the Hall effect switch can be placed on the member 60 and the magnet can be placed on the member 56). Or, an optical sensor (such as a photodiode) or other type of sensor can detect the position of the member 56 and/or knob 18. In such an embodiment, the position of the knob along axis A can proportionately control a function or setting of the device 10. For example, such movement can control the volume of audio output of the device, motion of a cursor across a display, or the brightness of lights inside a vehicle.

A pull switch can be implemented similarly to the push switch shown in FIGS. 3a and 3b. For example, a switch similar to switch 58 can be grounded and provided on the opposite side of pushed member 56 so that when knob 18 is pulled in a direction opposite to direction 62, a button on this switch is engaged by the pusher member to detect the pulled motion. The pull motion of knob 18 can also be sensed in a continuous range similar to the push embodiments described above. In some embodiments, both push and pull motions of the knob 18 may be provided and sensed.

A spring member 64 is rigidly coupled to the pushing member 56 at one end and is rigidly coupled to a rotatable end member 66 at its other end. Spring member 64 is compressed when the knob 18 and pusher member 56 are moved in the direction of arrow 62. Spring member 64 thus provides a spring force that biases the knob 18 in the direction opposite to direction 62. If the knob 18 is not forced in direction 62, the spring bias moves the knob 18 opposite to direction 62 until the knob reaches its rest position. In those embodiments including a pull motion of the knob 18 in the direction opposite to direction 62, a spring member can be included on the opposite side of pusher member 56 to spring member 64, to bias the knob 18 in direction 62 after the user has pulled the knob. In yet other embodiments, no spring member 64 is provided, and the knob 18 remains at any pushed or pulled position until actively moved to a new position by the user.

Spring member 64 also provides the transverse motion of knob 18 in the directions 28. The flexure of the spring element allows the knob to move in transverse degrees of freedom, while still being relatively torsionally stiff to allow forces to be transmitted effectively from an actuator to the knob 18 about axis A. In other embodiments, other types of couplings can be provided to allow a pivot or translational motion in the directions 28. For example, flexible disc servo couplings or one-piece flexible shaft disc couplings can be provided; such couplings are available from Renbrandt, Inc. of Boston, Mass. and Helical Products Company, Inc. of Santa Maria, Calif. In other embodiments, bent space frames provided in a square-plate coupling or a rectangular coupling can be used. Furthermore, a different alternate flexible coupling embodiment is described in greater detail with respect to FIGS. 4a-4c End member 66 is coupled to a rotatable shaft 68 of an actuator 70. The housing 72 of actuator 70 is rigidly coupled to grounded member 74, and the shaft 68 rotates with respect to the housing 72 and the member 74. Actuator 72 can be controlled to output force on rotating shaft 68 about axis A, thus driving the shaft and all components rigidly coupled to the shaft about axis A. The shaft 68 thus rotates end member 66, spring member 64, pusher member 56, shaft 50, and knob 18. The output force on knob 18 is felt by the user as force feedback. Actuator 70 can be any of a variety of different types of actuators, including a DC motor, voice coil, pneumatic or hydraulic actuator, magnetic particle brake, etc. A sensor 76 has a shaft rigidly coupled to the rotating shaft 68 of the actuator 70 and thus detects the rotation of the shaft 68 and the knob 18 about axis A. Sensor 76 is preferably a digital optical encoder but can alternatively be a different type of sensor, such as an analog potentiometer, a photodiode sensor, a Hall effect sensor, etc.

The force feedback output on knob 18 can include a variety of different force sensations. The force feedback can be integrally implemented with the control functions performed by the knob. A basic force sensation is force detents that are output at particular rotational positions of the knob to inform the user how much the knob has rotated and/or to designate a particular position of the knob. The force detents can be simple jolts or bump forces to indicate the detent's position, or the detents can include forces that attract the knob to the particular rotational detent position and resist movement of the knob away from that position. The position can correspond to a particular radio station frequency or other station (e.g., television station frequency), thus making selection easier for the user. Such detents can be provided for additional functions, such as volume control for sound speakers, fast forward or rewind of a video cassette recorder or computer-displayed movie (such as a DVD movie), scrolling a displayed document or web page, etc. Force feedback "snap-to" detents can also be provided, for example, for the favorite station frequencies preprogrammed by the user, where a small force biases the knob to the detent position when it is just outside the position.

Also, the magnitude of the force detents can differ based on the value being controlled. For example, a radio frequency having a higher value might be associated with a stronger force detent, while a lower radio frequency might be associated with a weaker force detent when it is displayed, thus informing the user generally of the radio station being displayed without requiring the user to look at the display 14 (which is particularly useful when operating the device 10 while performing another task, such as driving a vehicle). In some embodiments, the user can also change the magnitude of detents associated with particular values, such as radio stations, to preferred values so as to "mark" favorite settings. Programmability of the location of the detents in the rotary degree of freedom is also convenient since preferred radio frequencies are most likely spaced at irregular intervals in the radio frequency range, and the ability to program the detents at any location in the range allows the user to set detents to those preferred stations. In addition, the knob can be moved by the actuator 70 to select the nearest preprogrammed station or preferred setting. Also, different sets of detent force profiles can be stored in a memory device on the device 30 and a particular set can be provided on the knob 18 by a microprocessor or other controller in the device 30.

Another type of force sensation that can be output on knob 18 is a spring force. The spring force can provide resistance to rotational movement of the knob ill either direction to simulate a physical spring on the knob. This can be used, for example, to "snap back" the knob to its rest or center position after the user lets go of the knob, e.g. once the knob is rotated past a particular position, a function is selected, and the user releases the knob to let the knob move back to its original position. A damping force sensation can also be provided on knob 18 to slow down the rotation of the knob, allowing more accurate control by the user. Furthermore, any of these force sensations can be combined together for a single knob 18 to provide multiple simultaneous Force effects.

The spring return force provided in the rotary degree of freedom of the knob 18 can also be used to implement a rate control paradigm. "Rate control" is the control of a rate of a function, object, or setting based on the displacement of the knob 18 from a designated origin position. The further the knob is moved away from the origin position, the greater the rate of change of controlled input. For example, if a rate control knob 18 with a spring return force is used to control the radio frequency, then the further the knob is moved from the center origin position, the faster the radio frequency will change in the appropriate direction. The frequency stops changing when the knob is returned to the origin position. The spring force is provided so that the further the user moves the knob away from the origin position, the greater the force on the knob in the direction toward the origin position. This feels to the user as if he or she is inputting pressure or force against the spring rather than rotation or displacement, where the magnitude of pressure dictates the magnitude of the rate. However, the amount of rotation of the knob is actually measured and corresponds to the pressure the user is applying against the spring force. The displacement is thus used as an indication of input force.

This rate control paradigm differs from the standard knob control paradigm, which is known as "position control", i.e. where the input is directly correlated to the position of the knob in the rotary degree of freedom. For example, in the radio frequency example, if the user moves the knob to a particular position, the radio frequency is changed to a particular value corresponding to the rotary position of the knob. Force detents are more appropriate for such a paradigm. In contrast, in the rate control example, moving the knob to a particular position causes the radio frequency to continue changing at a rate designated by the position of the knob.

Since the spring force and detent forces are programmable and can be output as directed by a microprocessor or other controller, a single knob 18 can provide both rate control and position control over functions or graphical objects. For example, a mode selector, such as a button or the push/pull knob motion, can select whether rate control or position control is used. One example of a force feedback device providing both rate control (isometric input) and position control (isotonic input) is described in greater detail in co-pending patent application Ser. No. 08/756,745, filed Nov. 26, 1996, and incorporated herein by reference. Such rate control and position control can be provided in the rotary degree of freedom of the knob 18. Also, if knob 18 is provided with force feedback in the transverse degrees of freedom or in the push/pull linear degree of freedom, then the rate control and position control modes can be provided in those degrees of freedom.

Other force sensations that can be output on knob 18 include forces that simulate ends of travel for the knob 18 or inform the user that the end of travel has been reached. For example, as the user rotates the knob in one direction to adjust the radio frequency 22, the end of the radio frequency range is reached. There is no hard stop on the knob 18 at this position, but the actuator 70 can be controlled to output an obstruction force to prevent or hinder the user from rotating the knob further in that direction. Alternatively, a jolt force can be output that is stronger in magnitude than normal detents, which informs the user that the end of the frequency range has been reached. The user can then continue to rotate the knob in that direction, where the displayed frequency 22 wraps around to the beginning value in the range.

In another alternate embodiment, one or more of the transverse motions of knob 18 in directions 28 can be actuated. For example, a greater range of motion can be provided for each transverse direction of the knob than typically allowed by a hat switch, and a linear or rotary actuator can be provided to output forces in the transverse degree of freedom, in one or both directions (toward the center position and away from the center position of the knob). For example, one or more magnetic actuators or solenoids can be used to provide forces in these transverse directions.

Furthermore, in other embodiments, the pull and/or push motion of knob 18 along axis A can be actuated. For example, a jolt force can be output on the knob in the linear degree of freedom along axis A as the user pushes the knob. Also, the spring return force provided by spring member 64 can instead be output using an actuator controlled by a microprocessor.

It should be noted that the embodiment of FIGS. 3a and 3b is not the only embodiment of the present invention. For example, some embodiments may only include the transverse motion of knob 18 and not the push and/or pull functionality nor the force feedback functionality. Other embodiments may only include the push and/or pull functions. Yet other embodiments may only include force feedback with transverse knob motion, or force feedback with push and/or pull functions.

Figure 4A:
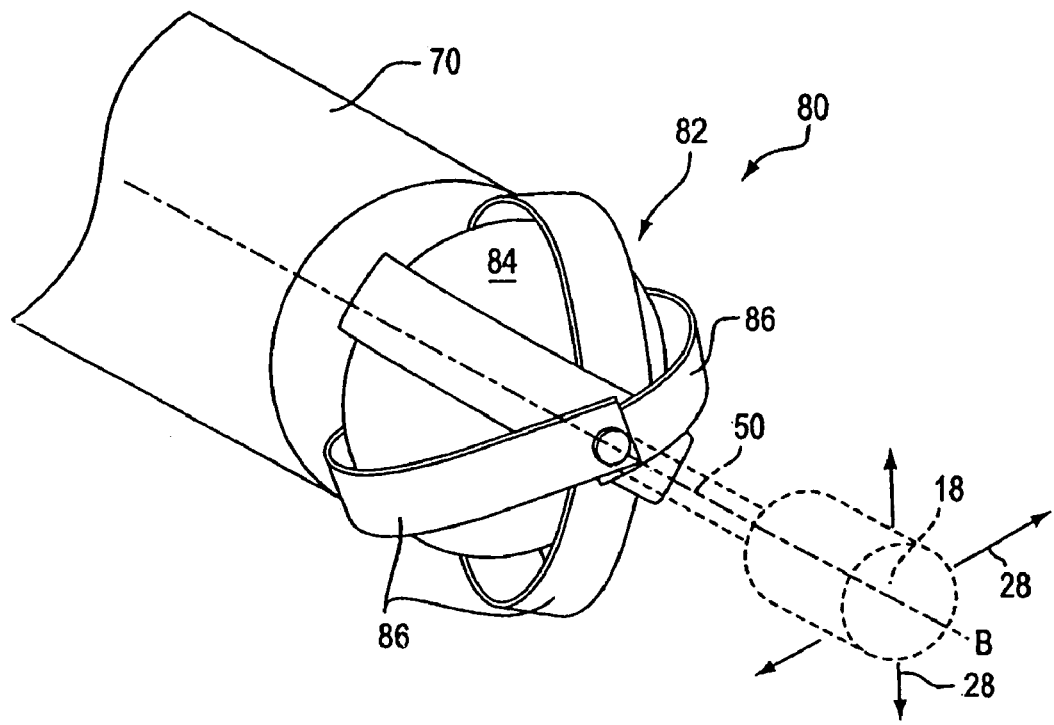
FIG. 4a is a perspective view of a second embodiment of the mechanism for implementing the control knob of the present invention.
Figure 4B:
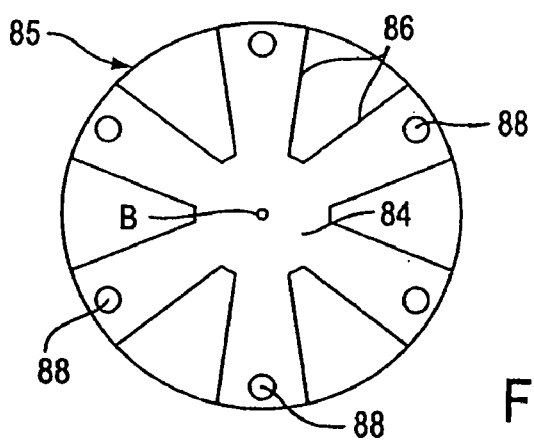

FIG. 4a is a perspective view of an alternate embodiment 80 of the control knob 18 of the present invention. In embodiment 80, knob 18 is coupled to shaft 50, which is rigidly coupled to a flex member 82. Flex member 82 includes a base plate 84 and a plurality of bent portions 86 extending from the base plate 84. For example, as shown in FIG. 4b, the flex member 82 can be formed by cutting out the circular base plate 84 and the portions 86 from a unitary piece 85 of material, such as spring steel or stainless steel. The unitary piece is preferably provided as a thin sheet. Holes 88 or other apertures can be placed near the ends of the portions 86. Referring back to FIG. 4a, the portions 86 are then bent such that the holes 88 substantially align with the other holes 88, where the holes 88 are aligned with axis B that extends approximately perpendicular to the surface of the base plate 84. The base plate 84 is rigidly coupled to the rotating shaft of the actuator 70.

Figure 4C:
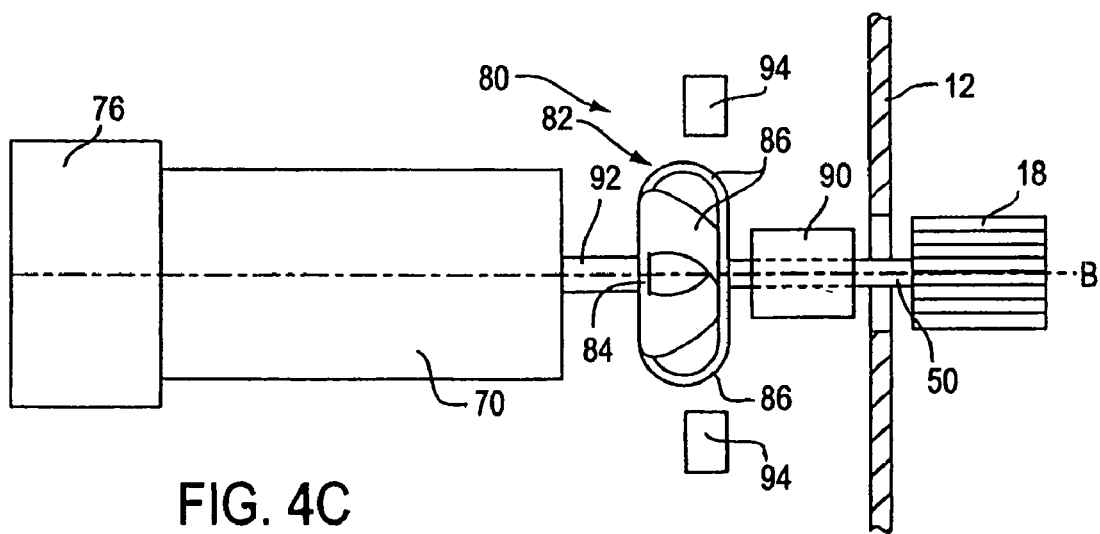

FIG. 4c is a side elevational view of the embodiment 80 of FIG. 4a. In the described embodiment, knob 18 is coupled to shaft 50, which extends through a switch 90 and is coupled to the bent portions 86 of the flex member 82. The switch 90 is preferably similar to the switch 52 described above with reference to FIGS. 3a and 3b. For example, a microswitch can be provided on the inside surface of the housing of switch 90 for each transverse direction of knob 18 that is to be sensed. The base plate 84 of the flex member 82 is rigidly coupled to shaft 92 of actuator 70. The shaft 92 is rigidly coupled to a shaft (not shown) of sensor 76, which has a grounded housing that is coupled to the grounded housing of actuator 70.

Alternatively, a plurality of sensors can be positioned external to the flex member 82 instead of using switch 90. For example, switches 94 can be positioned on two or more sides around the flex member 82, depending on how many directions are to be sensed. Switches 94 can be contact switches that each detect when the portions 86 move to engage the contact switch, thus indicating movement of knob 18 in a particular transverse direction. Alternatively, members can be positioned on shaft 50 which extend to the sides of the shaft and which engage electrical contacts or other sensors. In other embodiments, other switches or sensors can be used, as described above in the embodiment of FIG. 3a. A spring (not shown) can also be coupled to the shaft 50, flex member 82, or knob 18 to provide linear motion along the axis B and allow the knob 18 to be pushed and/or pulled by the user, as described in the embodiment of FIG. 3a. Some types of flexible couplings that allow transverse motion of the knob 18 may also allow linear motion along axis B, such as flexible disc servo couplings, in which case such as spring may not be needed.

In operation, the transverse motion of knob 18 in embodiment 80 operates as follows. The knob 18 is moved by the user approximately in a transverse direction 28, which causes the shaft 50 to move with the knob by pivoting approximately about the end of the shaft 50 where it is coupled to the portions 86. Shaft 50 is allowed such movement due to the flexibility in portions 86. In some embodiments, the knob 18 is also allowed to translate in a transverse direction 28 as well as or in addition to pivoting approximately in directions 28. When the knob 18 is rotated about axis B (by the user or the actuator), the shaft 50 rotates about its lengthwise axis, causing the flex member 82 to rotate about axis B. Since the portions 86 are stiff in the rotational direction about axis B, torque output on the shaft 50 and on the flex member 82 is transmitted accurately from actuator 70 to knob 18 and from knob 18 to sensor 76. Thus, the rotation on flex member 92 causes the shaft 92 to rotate, which is sensed by sensor 76. The rotational force about axis B output by actuator 70 is similarly transmitted from shaft 92, through flex member 82, to shaft 50 and knob 18.

Figure 5:
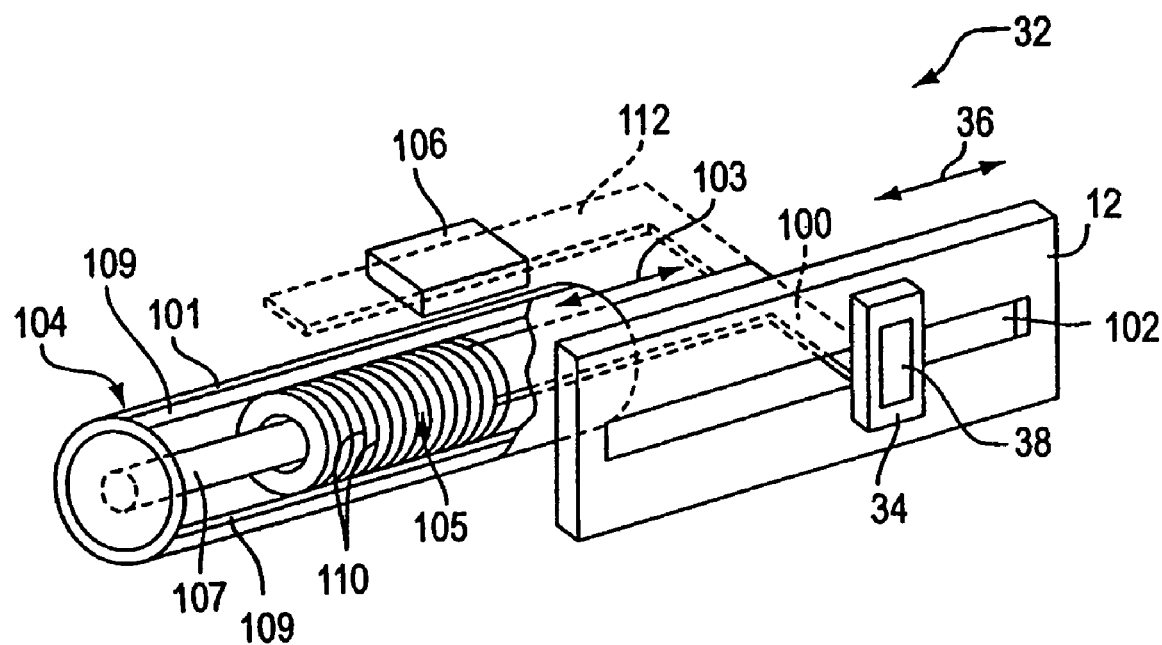
FIG. 5 is a perspective view of a linear slider control of the present invention.

FIG. 5 is a perspective view of an exemplary embodiment for the slider control 32 as shown in FIG. 1. Slider control 32 includes slider knob 34 which may move in a linear degree of freedom as indicated by arrow 36. In the described embodiment, a transmission member 100 is rigidly coupled to the knob 34 and extends through a slit or opening 102 in the front panel 12 or other grounded member. Transmission member 100 can be coupled to an actuator, such as linear voice coil actuator 104

The member 100 can move in and out of a housing 101 of actuator 104 as indicated by arrow 103. The housing 101 preferably includes a central core 107 and a number of elongated magnets 109. An armature 105 includes a hollow, cylindrical member having an inner surface which slidingly engages the core 107. Wrapped around the armature 105 are coils 110 that are electrically coupled to actuator and/or sensor interfaces. The armature 105 is coupled to the transmission member 100 so that the armature 105 and member 100 can move in a linear fashion as indicated at arrow 103. Other voice coil configurations can also be used, such as differently shaped cores, different coil layouts, etc. Voice coil actuator 104 can serve both as a sensor and an actuator. Alternatively, the voice coil can be used only as an actuator, and a separate sensor 106 can be used. Separate sensor 106 can be a linear sensor that senses the motion or position of an extension 112 that is coupled to the transmission member 100 and moves linearly when the transmission member moves. Voice coil actuators such as actuator 104 are described in greater detail in U.S. Pat. No. 5,805,140, the disclosure of which is incorporated herein by reference. In particular, the operation of the voice coils as actuators and/or sensors is described therein.

Other types of actuators 104 and transmissions can also be used in slider control 32. For example, a capstan drive and cable transmission can provide linear forces on the knob 34. Other types of actuators suitable for use with the slider include active actuators, such as linear current control motors, stepper motors, pneumatic/hydraulic active actuators, a torquer, etc. Passive actuators may also be used, such as magnetic particle brakes, friction brakes, fluid controlled passive actuators, or other actuators which generate a damping resistance or friction in a degree of motion.

Slider knob 34 can also include a button 38 which is used to provide input to the device 10. In yet other embodiments, the slider knob 34 can be pushed and/or pulled in a linear degree of freedom approximately perpendicularly to the surface of front panel 12. In such an embodiment, a moveable contact switch can be provided between the knob 34 and the transmission member 100. A spring member can also be provided similarly to the embodiment of FIGS. 3a-3b and 4a-4c to bias the knob 34 to a neutral rest position.

The force sensations and modes described above for the rotary knob in FIGS. 3a-3b and 4a-4c may also be used for the slider control 32 in a linear degree of freedom. For example, force detents can be applied in a position control paradigm as the knob 34 is moved in its linear degree of freedom. In a rate control paradigm, a spring return force can bias the knob 34 toward a center origin position, for example the center of the range of motion of the knob. The further the user moves the knob from the origin position, the greater the spring force opposing that motion and the greater the rate of the controlled value changes (increases or decreases). Other force effects include damping forces, texture forces, jolts, obstruction forces, assistive forces, periodic forces such as vibration forces, and end-of-travel forces.

Figure 6A:
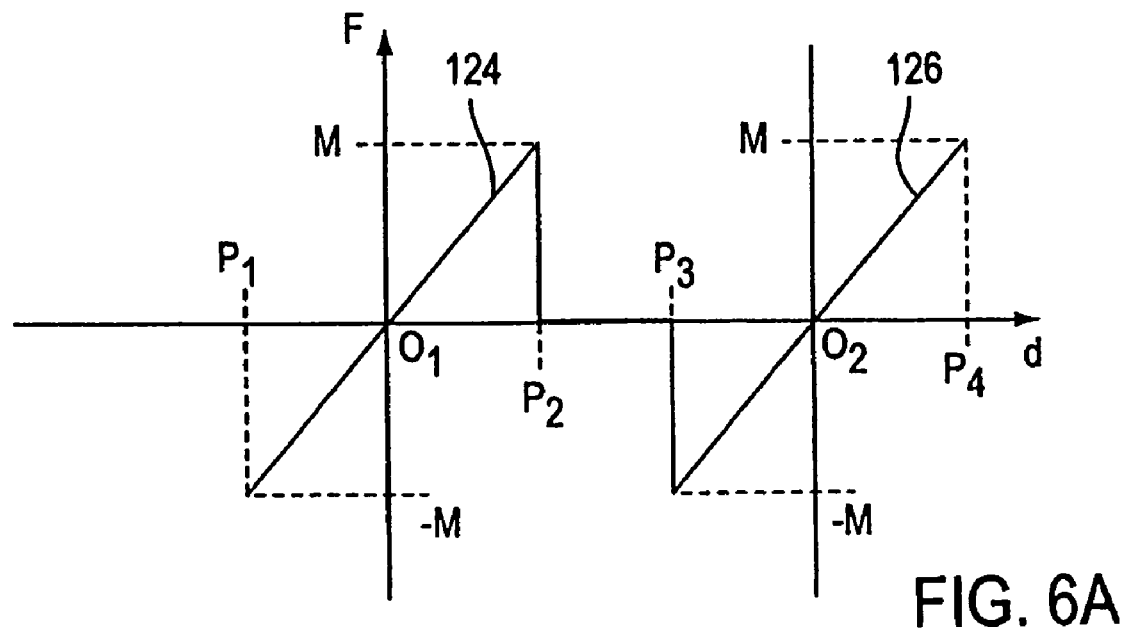
FIGS. 6a-6d illustrate nonoverlapping, overlapping, and hysteresis features of force detent profiles.
Figure 6B:
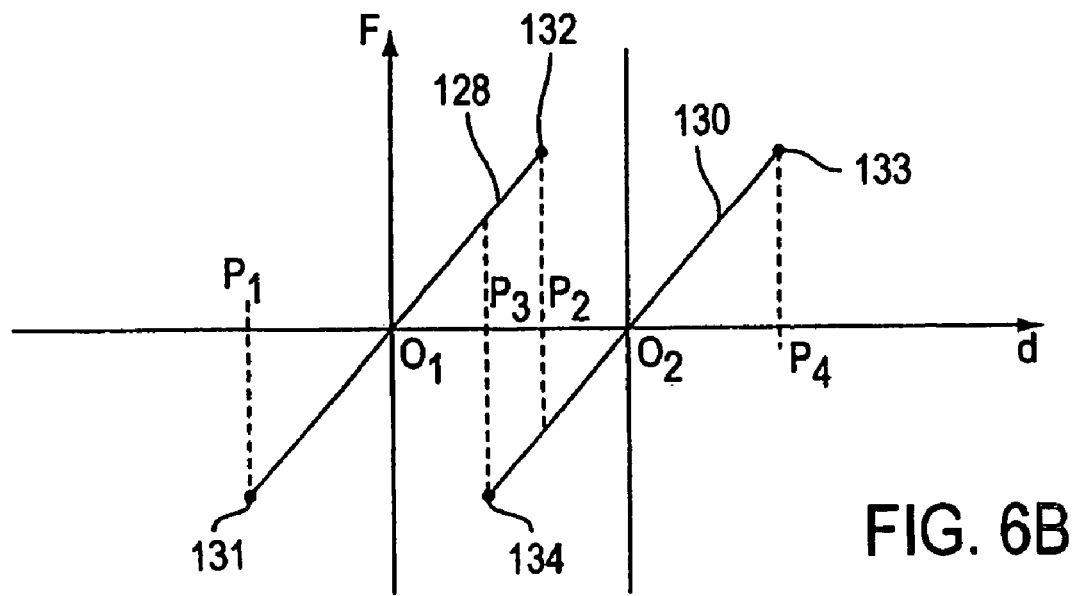

FIGS. 6a and 6b are diagrammatic illustrations illustrating detent force profiles suitable for use with the knobs of device 10. Detent force profiles can be implemented by a microprocessor or other controller based on instructions stored in a computer readable medium, such as a memory circuit, magnetic disk, optical disk, etc. In FIG. 6a, a detent force profile is shown. The vertical axis F represents the magnitude of force output, where a positive F value indicates force in one direction, and a negative F value indicates force in the opposite direction. The horizontal axis d represents the distance or position of the moved user object (knob) in a degree of freedom, where the origin position O indicates the position of the detent, a positive d is a position past the origin of the detent in one direction, and a negative d is a position past the origin of the detent in the opposite direction. The curve 124 represents the force output for a single detent over a position range for the detent. Thus, for example, if the user moves the knob clockwise toward the detent origin O1, the motion may be from the left toward the origin O1 on the axis d. A force toward the origin is output at position P1 at a magnitude −M to assist the user in moving the knob clockwise toward the origin. As the user continues to move the knob clockwise toward the origin O1, the assisting force is decreased in magnitude until no force is output when the knob is positioned at the origin position. If the user moves the knob counterclockwise from the origin position O1 (from right to left), the force will resist such motion in an increasing manner until the knob has been moved to position P1, after which the force magnitude drops to zero. Similarly, on the positive side of the d axis, if the user rotates the knob clockwise away from the detent origin position O1 (corresponding to movement from left to right), an increasing magnitude of force is output until the knob reaches the position P2, at which point the force magnitude drops from its maximum at M to zero. If the user moves the knob counterclockwise from position P2 toward the origin O1, the user initially feels a large magnitude force assisting that movement, after which the assisting force gradually decreases until it is zero at the origin O1. Preferably, point P1 is at an equal distance from origin O1 as point P2.

Additional detents may be positioned in the degree of freedom of the knob in successive positions, represented along axis d. For example, curve 126 represents another detent that is encountered shortly after leaving the previous detent curve 124 when turning the knob in a particular direction.

A problem occurring with closely spaced detents is that often the user moves the knob from a first detent to a second detent but unintentionally moves the knob past the second detent due to the assistive detent forces of the second detent. This is because the force from the user required to move the knob past the resistive force of the first detent curve is combined with the assistive force of the second detent curve, causing the knob to unintentionally move past the second origin and past the endpoint of the second detent curve. Furthermore, the same problem occurs when the user moves the knob in the opposite direction, from the second detent to the first detent. The user must exert force to overcome the resistance at the last point of the second detent curve, which causes the knob to quickly move past the first point of the first detent curve, where the assistive force is added to the motion to cause the knob to unintentionally move past the last encountered point of the first detent.

FIG. 6b shows a detent force profile of the present invention in which the detent forces of two successive detents are partially overlapped due to the detents, and provide a hysteresis-like force effect. The two detent curves 128 and 130 are identical, thus allowing a single force command to create the multiple detents if desired. Endpoint 131 of curve 128 is positioned at position P1 and endpoint 132 of curve 128 is positioned at position P2, where P2 is about the same distance from origin O1 as P1. Similarly, endpoint 134 of curve 130 is positioned at position P3 and endpoint 133 of curve 130 is positioned at position P4, where P4 is about the same distance from origin O2 as P3. Detent curve 128 ends at endpoint 132 on the right side of origin O1 and within the range of forces of detent curve 130. Preferably, the end point 132 of curve 128 is positioned well after the endpoint 134 of curve 130, such that the point 132 has a position in the middle of the range between point 134 and the origin O2. The overlapped zone is between positions P3 and P2. In addition, the end point 132 of the first detent preferably does not extend past the origin O2 of the second detent into the positive side of the second detent. If another detent is positioned further on the d axis after curve 130, the end point 133 of curve 130 preferably is positioned well after the starting endpoint of the next detent curve and not past the origin of the next detent curve. Similar positioning can be provided for curves before curve 128 on axis d.

Figure 6C:
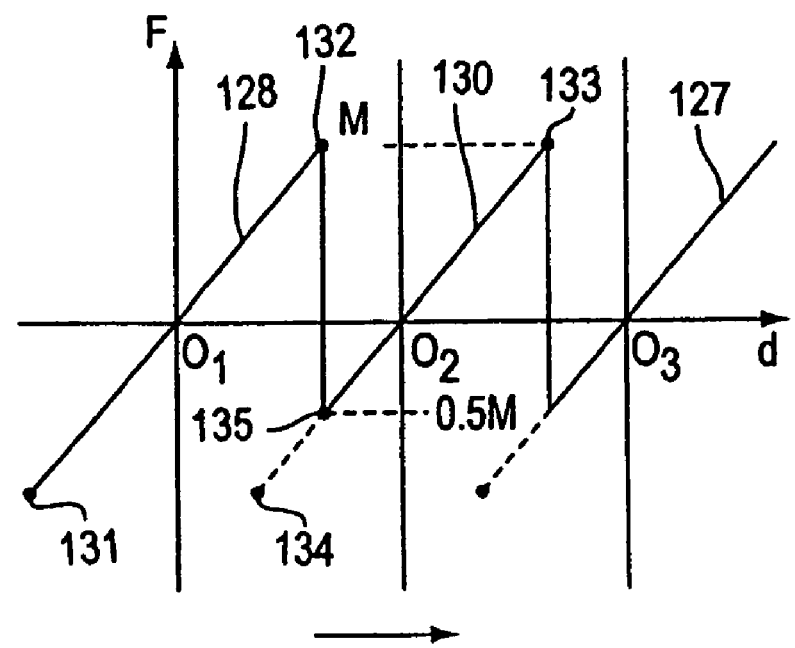

To solve the problem of unintentionally moving past a successive detent, the range of the second or successive detent is adjusted such that a lesser magnitude is preferably output at the beginning of the successive detent than would normally be output if the entire curve of the successive detent were used. Furthermore, the force detent curve used to output force is preferably different depending on the direction of the knob, similar to a hysteresis effect. As shown in FIG. 6c, when moving the knob so the knob position changes from left to right, the force at the beginning of the range of detent curve 130 is at point 135 having a magnitude of 0.5 M, which is one-half the magnitude M of the force at the other endpoint 133 of the range of curve 130 (ignoring the signs or direction of the forces). Of course, in other embodiments point 135 can have a magnitude of other fractions of M, such as one-third or three-fourths of M. Additional curve 127 can be similarly positioned and provide a similar overlap with curve 130, and additional curves may be added before curve 128 and/or after curve 127.

Figure 6D:
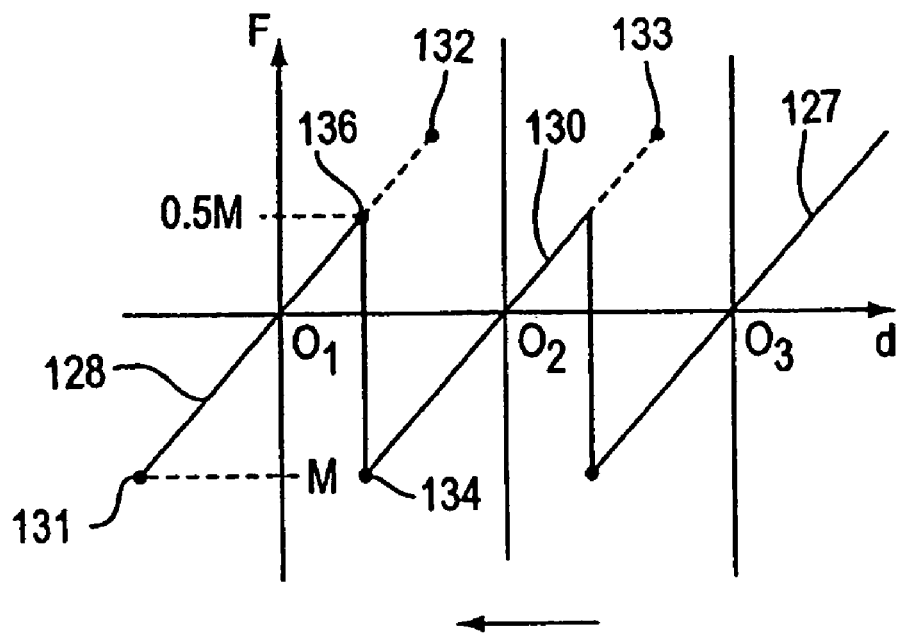

As shown in FIG. 6d, when moving the knob in the other direction so the knob position changes from right to left, the endpoints of the curve 130 reverse in magnitude with respect to the endpoints shown in FIG. 6c. In FIG. 6d, starting from origin O2, the force at the beginning of the range of detent curve 128 is at point 136 having a magnitude of 0.5 M, which is one-half the magnitude M of the force at the other endpoint 131 of curve 128 (other fractions of M can be provided for endpoint 136 in other embodiments). Any additional curves, such as curve 127, can be provided with a similar overlap. The force output on the knob thus changes depending on the direction of the knob. In a digital sensing system (e.g. using a digital encoder), the direction can be determined from a history of sensed values. For example, one or more sensed position values can be stored and compared to a current sensed position to determine the knob direction.

The use of a lesser magnitude at the beginning of the second detent reduces the tendency of the user to unintentionally skip past a second detent after moving the knob over a first detent closely spaced to the second detent. For example, when moving the knob left to right (e.g., clockwise) from position P1, a first detent (curve 128) ends at point 132 of curve 128, after which the force magnitude of point 135 on curve 130 begins assisting the knob's movement. This magnitude is less than the magnitude of the "original" beginning point 134, i.e. the beginning point of the full curve 130. Thus, less force is assisting the user to move toward the origin O2 of curve 130 than if the force magnitude for beginning point 134 of the curve 130 were in effect. With less force assisting motion toward origin O2, the user has an easier time slowing down the knob and preventing the knob from unintentionally overshooting the origin O2. Furthermore, the changing of endpoints of the detent curve, as dependent on direction, provides a hysteresis-like effect the reduces the unintentional skip in both directions. Thus, when moving the knob from right to left (e.g., counterclockwise) starting at origin O2, a first detent (curve 130) ends at point 134 of curve 130, after which a magnitude of point 136 on curve 128 begins assisting the knob's movement. This magnitude is less than the magnitude of the "original" beginning point 134. Thus, less force is assisting the user to move toward the origin O1 of curve 128 than if the force magnitude for beginning point 132 of the curve 128 were in effect. With less force assisting motion toward origin O1, the user has an easier time slowing down the knob and preventing the knob from unintentionally overshooting the origin O1.

The same overlapping and hysteresis feature can be provided for differently-shaped detents as well, such as curved detents of FIGS. 7a-7e, detents having deadbands around the origin O, and/or other-shaped force profiles. In embodiments having detent endpoints that are spaced further apart, or which have very gradually-sloping curves, the overlap and hysteresis may not be needed since there may be enough space in the degree of freedom for the user to control the knob from unintentionally moving past the next detent.

Figure 7A:
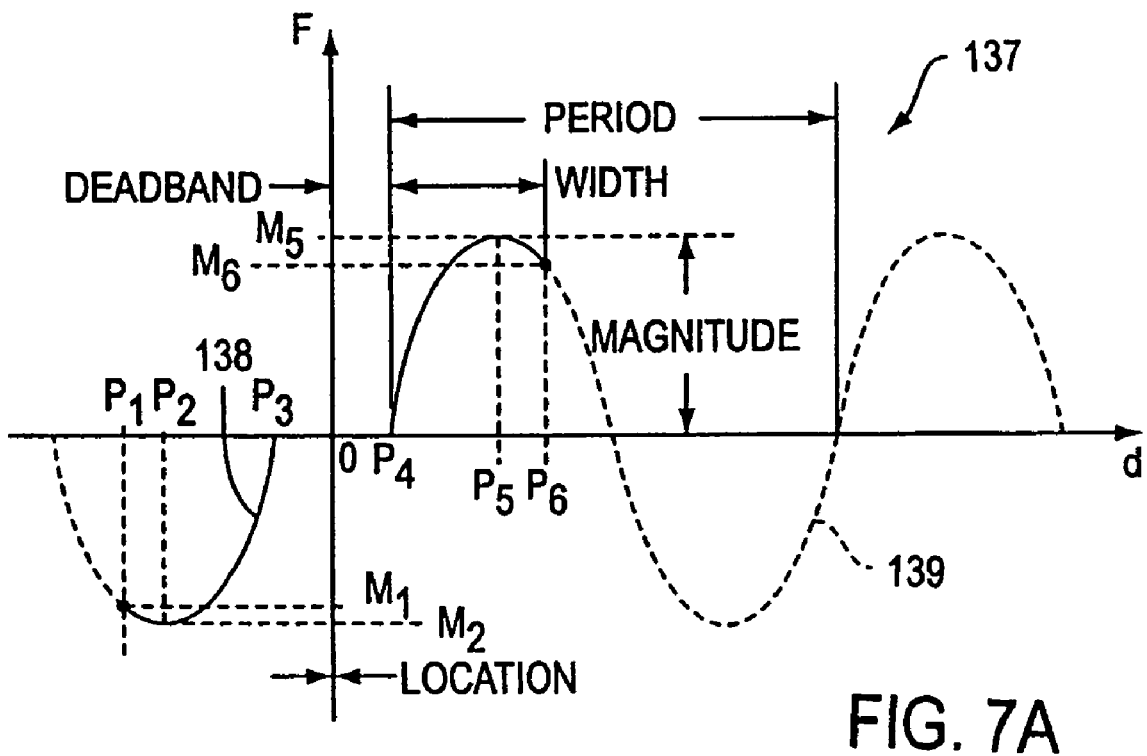
FIGS. 7a-7e are graphs illustrating the creation of detent force profiles from periodic waves according to the present invention.

FIG. 7a is a graph illustration 137 of a periodic wave 139 that can be used to provide a variety of detent force sensations for use with the knob control device of the present invention. The periodic wave represents force exerted on the knob (axis F) vs. the position or displacement (axis d) of the knob, similar to the force detent profile shown in FIGS. 6a and 6b. The wave 139 is a periodic function, such as a sine wave, triangle wave, square wave, etc. In FIG. 7a, a sine wave shape is shown. In the present invention, a portion of the wave may be used to provide detent and other force sensations for the knob 18 or 34. Various parameters of the sine wave are shown in FIG. 7a, including period and magnitude.

Curve 138 (solid line) represents a detent force effect that has been created based on the sine wave 139. Curve 138 has a width, which is the amount of the wave 139 along axis d used for the force detent. The location of the detent is the position in the degree of freedom at which the detent force is centered, i.e. the location of the origin position O of the detent. A deadband can be defined to be a distance from the origin O to a specified point, a region in which zero forces are output on the knob. Thus, the curve 138 shown in FIG. 7a shows a detent force starting at a magnitude M1 at location P1 and, when the knob is moved toward the origin O, the force increases to the maximum point M2 at location P2 and then decreases until point P3, where the deadband is reached (zero magnitude). Similarly, at point P14 on the other side of the origin O, the force increases from zero to a maximum magnitude M5 at location P5, after which the force drops a short distance to magnitude M6 at location P6. The force then drops to zero for increasing d, until another detent effect is encountered. The small decreases in force magnitude from the maximum magnitude at the end points of the curve 138 are useful in some detent embodiments to provide a less extreme assistive or resistive force to the user when entering or exiting the detent range, e.g., to gradually lead the user into the detent range before outputting the maximum force. This can provide a smoother-feeling and, in some cases, a more easily-selected detent (i.e., it can be easier to position the knob at the detent's origin).

The detent curve 138 can thus be defined using the parameters shown in FIG. 7*a*. For example, a force command protocol can provide a number of different commands that can cause the output of different force sensations to the user. The commands can each include a command identifier followed by one or more command parameters that define and characterize the desired force sensation. An example of a command defining a detent curve 138 is as follows:

DETENT (TYPE, PERIOD, MAGNITUDE, LOCATION, DEADBAND, FLAG, WIDTH, PHASE, OFFSET, LOCATION, INCREMENT, ARRAY POINTER)

The DETENT identifier indicates the type of force sensation. The TYPE parameter indicates a type of periodic wave from which to base the force detent curve, such as a sine wave, triangle wave, square wave, ramp, etc. The PERIOD and MAGNITUDE parameters define those characteristics of the periodic wave. The LOCATION parameter defines the location of the origin position for the detent in the degree of freedom of the knob. The DEADBAND parameter indicates the size of the deadband around the origin position. The FLAG parameter is a flag that indicates whether the detent is provided on the positive side, the negative side, or both sides around the location (origin position). The WIDTH parameter defines the amount of the wave 139 used for the detent curve, i.e. the extent of the wave used starting from the PHASE position. The PHASE parameter indicates the starting position of the detent curve 138 on the wave 139 (and is described in greater detail below). The OFFSET parameter indicates the amount of magnitude offset that curve 138 includes from the d axis, and is described in greater detail below. The INCREMENT parameter indicates the distance in the degree of freedom of the knob between successive detent locations. The optional LOCATION ARRAY POINTER parameter indicates a location in a separate array that has been previously programmed with the particular positions in the degree of freedom of the knob at which the detents are located and (optionally) the total number of detents; the array can be provided in memory, such as RAM, or other writable storage device. For example, the array can be preprogrammed with three detents, at locations of 45 degrees, 78 degrees, and 131 degrees in the rotation of the knob. The array can be accessed is necessary to retrieve these locations at which detent forces are to be output. This can be useful when the detent locations are not evenly or regularly spaced in the degree of freedom, and/or when a particular number of detents are desired to be output.

Furthermore, in other embodiments, a periodic wave can be additionally "shaped" to form a particular detent curve. For example, an "envelope" can be applied to a periodic wave to shape the wave in a particular way. One method of shaping a wave is to define a first magnitude and a settle width, which is the distance required for the wave to settle to a second, lesser magnitude from the first magnitude. This settle width thus provides a ramping shape to the upper and/or lower portions of the periodic wave about axis d. Although such shaping is performed in a spatial domain, it is similar to the force signal shaping in the time domain described in co-pending U.S. patent application Ser. No. 08/747,841, incorporated herein by reference. Such shaping is also described in co-pending U.S. patent application Ser. Nos. 08/846,011 and 08/877,114, incorporated herein by reference. The shaping can be specified by parameters in a commands, such as a settled width parameter, magnitude parameters, etc.

The detent command can be sent by a supervisory microprocessor to a lower-level local microprocessor to decode and interpret the commands to control procedures provided in device 10 in firmware or other storage medium, as described with reference to FIG. 8 below. If a host computer and local microprocessor are used, the host computer can send the command to the local microprocessor, which parses/decodes and interprets the command and causes appropriate forces to be output. Commands and protocols for use in force feedback are described in greater detail in U.S. Pat. No. 5,734,373, incorporated by reference herein. Such commands can also be retrieved from a storage device such as memory and then parsed and interpreted by a local microprocessor.

The ability to define a force detent (in the spatial domain) in terms of a periodic waveform can be useful in force feedback implementations in which periodic force effects in the time domain are also provided. For example, vibration force sensations can be provided by outputting a periodic sine wave or square wave for the magnitude of the force over time. If such time-based effects can be output on knob 18 or 34, then it is convenient to use the same periodic wave definitions and data for defining force vs. position profiles for detents as shown in FIGS. 7*a*-7*e*.

Figure 7B:
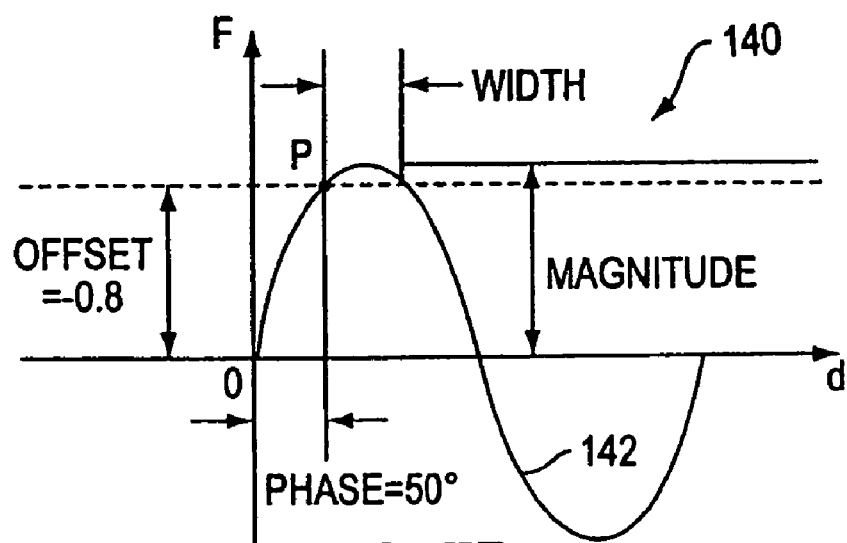

FIG. 7*b* is a graph illustration 140 showing particular parameters of the detent command described above which are applied to a periodic wave. Sine wave 142 has a magnitude and period as shown. A specified phase of the desired detent curve causes the detent curve to start at a position on wave 142 in accordance with the phase. For example, in FIG. 7*b*, a phase of 50 degrees is specified. This will cause the resulting detent curve to start at point P on the wave 142. A width parameter specifics the amount of the wave from the phase location to be used as the detent curve. Furthermore, an offset of −0.8 is indicated. This causes the resulting detent curve to be shifted down by 80% from the wave 142. Furthermore, a deadband is also specified (not shown in FIG. 7*b*.).

Figure 7C:
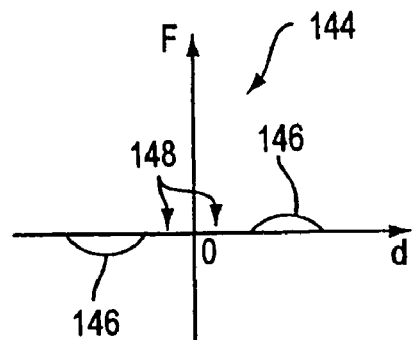

FIG. 7*c* is a graph 144 showing the resulting detent curve 146 obtained from the application of the parameters to the wave 142 described with reference to FIG. 7*b*. The portion of the wave 142 starting at the phase and positioned above the offset line in FIG. 7*b* is used in the detent curve 146. Furthermore, a deadband 148 has been added to the curve. The flag in the detent command has caused the positive side of the curve 146 to be mirrored on the negative side of the origin O. This detent curve 146 causes a detent force that is similar to the detent force described with reference to FIG. 7*a*, only smaller in magnitude and in position range over the degree of freedom of the knob.

Figure 7D:
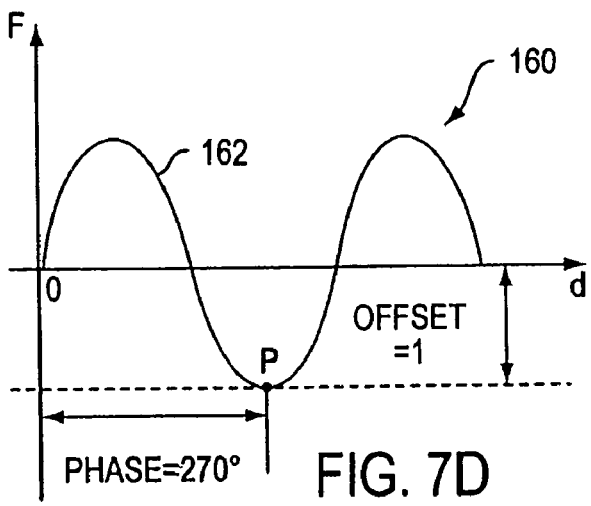
Figure 7E:
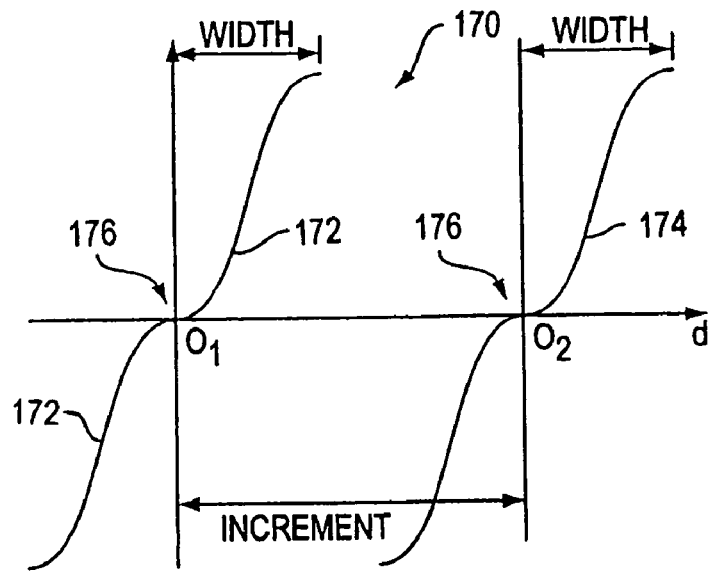

FIG. 7*d* is a graph 160 showing a periodic wave and parameters to be applied to the wave. Sine wave 162 is provided as described above, having a particular period and magnitude. An offset is specified for the resulting detent curve; in the example of FIG. 7*d*, the offset is 1, thus causing the detent curve to be shifted upward by its entire magnitude. A phase of 270 degrees is also indicated, so that the detent curve starts at the lowest magnitude of the wave 172 at point P. Furthermore, an increment is also specified as a parameter (not shown). FIG. 7*e* is a graph 170 illustrating the detent curves 172 and 174 resulting from the wave 162 and parameters described with reference to FIG. 7*d*. The portion of the wave 162 past point P and ending at a point defined by a width parameter is provided both on the positive side and the negative side of origin O1 of graph 170 for curve 172 (the positive and negative sides are designated by the flag parameter). A second curve 174 is also shown, where the origin O2 of the second curve is positioned at a distance from the origin O1 as specified by the increment parameter. Additional curves similar to curves 172 and 174 are provided at further distances at same increment from each other. The detent curves 172 and 174 provide a much steeper, less gradual detent force over the detent range than the other detent forces shown in FIGS. 7a and 7c. Furthermore, no actual deadband is specified, although the shape or each half of the curve 172 provides a small zone 176 where zero force is output, similar to a deadband.

Figure 8:
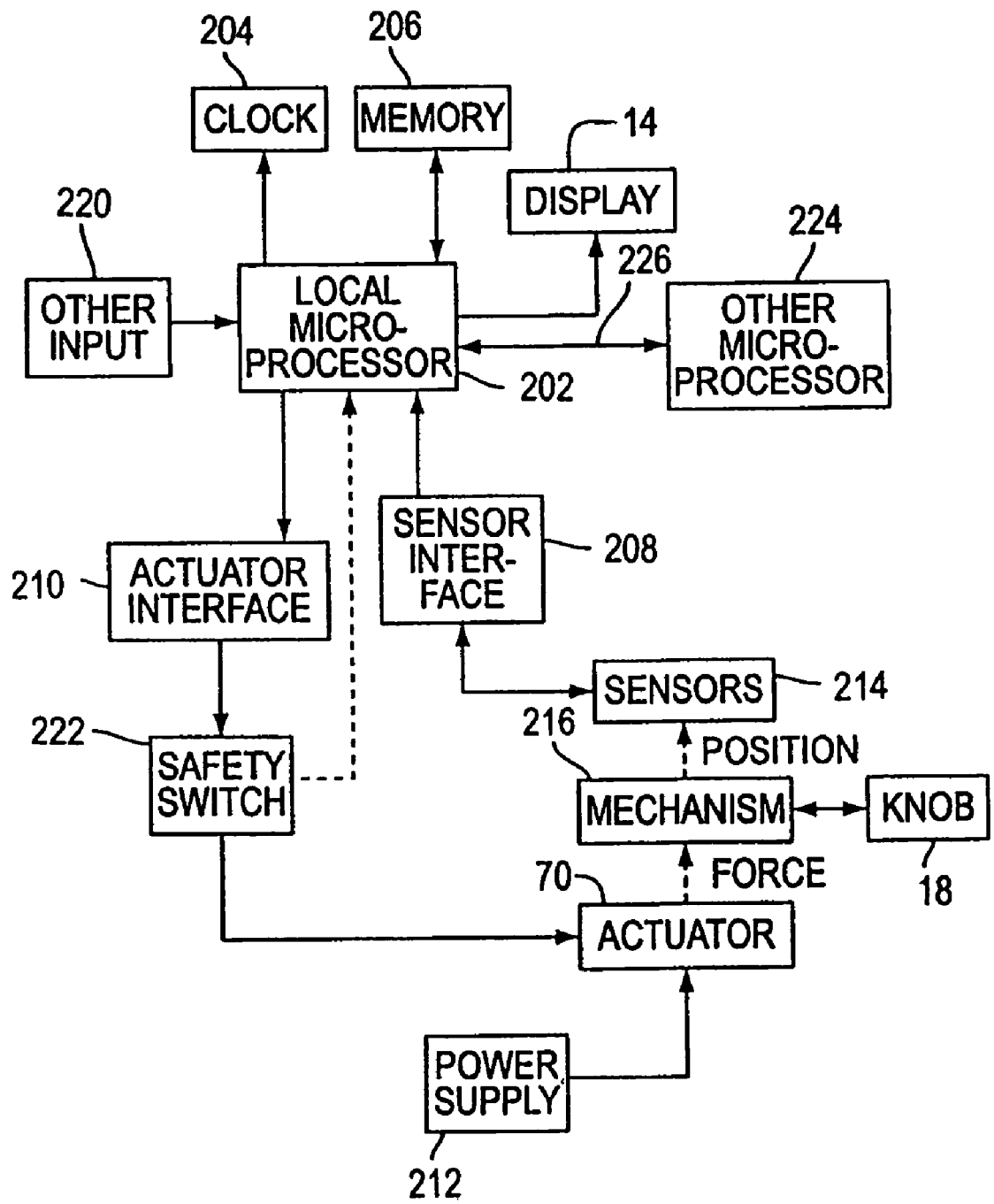
FIG. 8 is a block diagram of a control system for the control knob of the present invention.

FIG. 8 is a block diagram illustrating an electromechanical system 200 for the device 10 of FIG. 1 suitable for use with the present invention. A force feedback system including many of the below components is described in detail in co-pending patent application Ser. No. 09/049,155, filed Mar. 26, 1998, and U.S. Pat. No. 5,734,373, which are both incorporated by reference herein in their entirety.

In one embodiment, device 10 includes an electronic portion having a local microprocessor 202, local clock 204, local memory 206, sensor interface 208, and actuator interface 210.

Local microprocessor 202 is considered "local" to device 10, where "local" herein refers to processor 202 being a separate microprocessor from any other microprocessors, such as in a controlling host computer (see below), and refers to processor 202 being dedicated to force feedback and/or sensor I/O for the knob 18 of the interface device 10. In force feedback embodiments, the microprocessor 202 reads sensor signals and can calculate appropriate forces from those sensor signals, time signals, and force processes selected in accordance with a host command, and output appropriate control signals to the actuator. Suitable microprocessors for use as local microprocessor 202 include the 8X930AX by Intel, the MC68HC711E9 by Motorola and the PIC16C74 by Microchip, for example. Microprocessor 202 can include one microprocessor chip, or multiple processors and/or co-processor chips, and can include digital signal processor (DSP) functionality. Also, "haptic accelerator" chips can be provided which are dedicated to calculating velocity, acceleration, and/or other force-related data. Alternatively, fixed digital logic and/or state machines can be used to provide similar functionality.

A local clock 204 can be coupled to the microprocessor 202 to provide tilling data, for example, to compute forces to be output by actuator 70. In alternate embodiments using the USB communication interface, timing data for microprocessor 202 can be retrieved from the USB interface. Local memory 206, such as RAM and/or ROM, is preferably coupled to microprocessor 202 in interface device 10 to store instructions for microprocessor 202, temporary and other data, calibration parameters, adjustments to compensate for sensor variations can be included, and/or the state of the device 10. Display 14 can be coupled to local microprocessor 202 in some embodiments. Alternatively, a different microprocessor or other controller can control output to the display 14.

Sensor interface 208 may optionally be included in device 10 to convert sensors signals to signals that can be interpreted by the microprocessor 202. For example, sensor interface 208 can receive signals from a digital sensor such as an encoder and convert the signals into a digital binary number. An analog to digital converter (ADC) can also be used. Such circuits, or equivalent circuits, are well known to those skilled in the art. Alternately, microprocessor 202 can perform these interface functions. Actuator interface 210 can be optionally connected between the actuator 70 and microprocessor 202 to convert signals from microprocessor 202 into signals appropriate to drive the actuators. Actuator interface 210 can include power amplifiers, switches, digital to analog controllers (DACs), and other components, as well known to those skilled in the art. In alternate embodiments, actuator interface 210 circuitry can be provided within microprocessor 202 or in the actuator 70.

A power supply 212 can be coupled to actuator 70 and/or actuator interface 210 to provide electrical power. In a different embodiment, power can be supplied to the actuator 70 and any other components (as required) by an interface bus. Power can also be stored and regulated by device 10 and thus used when needed to drive actuator 70.

A mechanical portion is included in device 10, an example of which is shown above in FIGS. 3a-3b and 4a-4c. The mechanical portion can include some or all of the components needed for rotational motion of knob 18, transverse motion of knob 18, the push and/or pull motion of knob 18, and force feedback in any or all of these degrees of freedom of the knob.

Mechanical portion 200 preferably includes sensors 214, actuator 70, and mechanism 216. Sensors 214 sense the position, motion, and/or other characteristics of knob 18 along one or more degrees of freedom and provide signals to microprocessor 202 including information representative of those characteristics. Typically, a sensor 214 is provided for each degree of freedom along which knob 18 can be moved, or, a single compound sensor can be used for multiple degrees of freedom. Sensors 214 can include sensor 76, switch 52, and switch 58 as shown in FIGS. 3a-3b. For example, one switch 52 of FIGS. 3a-3b or switch 90 of FIG. 4c can include a sensor switch for each transverse direction 28 that the knob 18 can be moved. Examples of sensors suitable for rotary sensor 70 of FIGS. 3a-3b and 4a-4c include optical encoders, analog sensors such as potentiometers, Hall effect magnetic sensors, optical sensors such as a lateral effect photo diodes, tachometers, and accelerometers. Furthermore, both absolute and relative sensors may be used.

In those embodiments including force feedback, actuator 70 transmits forces to knob 18 in one or more directions in a rotary degree of freedom in response to signals output by microprocessor 202 or other electronic logic or device, i.e., it is "electronically-controlled." The actuator 70 produces electronically modulated forces which means that microprocessor 202 or other electronic device controls the application of the forces. Typically, an actuator 70 is provided for each knob 18 that includes force feedback functionality. In some embodiments, additional actuators can also be provided for the other degrees of freedom of knob 18, such as the transverse motion of the knob 18 and/or the push or pull motion of the knob. The actuators, such as actuator 70, can include active actuators, such as linear current control motors, stepper motors, pneumatic/hydraulic active actuators, a torquer (motor with limited angular range), voice coil actuators, etc. Passive actuators can also be used, including magnetic particle brakes, friction brakes, or pneumatic/hydraulic passive actuators, and generate a damping resistance or friction in a degree of motion. In some embodiments, all or some of sensors 214 and actuator 70 can be included together as a sensor/actuator pair transducer, as shown in FIGS. 3a-3b for actuator 70 and sensor 76.

Mechanism 216 is used to translate motion of knob 18 to a form that can be read by sensors 214, and, in those embodiments including force feedback, to transmit forces from actuator 70 to knob 18. Examples of mechanism 216 are shown with respect to FIGS. 3a-3h and 4a-4c. Other types of mechanisms can also be used, as disclosed in U.S. Pat. Nos. 5,767,839, 5,721,566, 5,805,140, and co-pending patent application Ser. Nos. 08/664,086, 08/709,012, and 08/736,161, all incorporated by reference herein.

Also, a drive mechanism such as a capstan drive mechanism can be used to provide mechanical advantage to the forces output by actuator 70. Some examples of capstan drive mechanisms are described in U.S. Pat. No. 5,731,804 and co-pending patent application Ser. Nos. 08/961,790, 08/736,161, all incorporated by reference herein. Alternatively, a belt drive system, gear system, or other mechanical amplification/transmission system can be used.

Other input devices 220 can be included in interface device 10 and send input signals to microprocessor 202. Such input devices can include buttons, such as buttons 16 on front panel 12 as shown in FIG. 1, used to supplement the input from the knob to the device 10. Also, dials, switches, voice recognition hardware (e.g. a microphone, with software implemented by microprocessor 202), or other input mechanisms can be used, can also be included to send a signal (or cease sending a signal) to microprocessor 202 or to the actuator 70 or actuator interface 210, indicating that the user is not gripping the knob 18, at which point all output forces are ceased for safety purposes. Such safety switches are described in U.S. Pat. No. 5,691,898 incorporated by reference herein.

Furthermore, a safety or "deadman" switch 222 can optionally be included for the knob 18 in those implementations providing force feedback on the knob. The safety switch prevents forces from being output on the knob when the user is not contacting or using it, and to prevent the knob from spinning on its own when the user is not touching it. In one embodiment, the safety switch detects contact of a user's digit (finger, thumb, etc.) with the knob 18. Such a switch can be implemented as a capacitive sensor or resistive sensor, the operation of which is well known to those skilled in the art. In a different embodiment, a switch or sensor that detects pressure on the knob 18 from the user can be used. For example, a switch can be sensitive to a predetermined amount of pressure, which will close the switch. Alternatively, a pressure magnitude sensor can be used as the safety switch, where forces are output on the knob only when a pressure magnitude over a minimum threshold is sensed. A pressure requirement for safety switch 222 has the advantage of ensuring good contact between finger and knob before forces are Output; output forces are enabled only when the user is moving or actively using the knob. Thus, if the user simply rests his or her finger lightly on the knob without intending to use it, no forces will be output to surprise the user.

Other microprocessor 224 can be included in some embodiments to communicate with local microprocessor 202. Microprocessors 202 and 224 are preferably coupled together by a bi-directional bus 226. Additional electronic components may also be included for communicating via standard protocols on bus 226. These components can be included in device 10 or another connected device. Bus 226 can be any of a variety of different communication busses. For example, a bi-directional serial or parallel bus, a wireless link, a network architecture (such as Canbus), or a uni-directional bus can be provided between microprocessors 224 and 202.

Other microprocessor 224 can be a separate microprocessor in a different device or system that coordinates operations or functions with the device 10. For example, other microprocessor 224 can be provided in a separate control subsystem in a vehicle or house, where the other microprocessor controls the temperature system in the car or house, or the position of mechanical components (car mirrors, seats, garage door, etc.), or a central display device that displays information from various systems. Or, the other microprocessor 224 can be a centralized controller for many systems including device 10. The two microprocessors 202 and 224 can exchange information as needed to facilitate control of various systems, output event notifications to the user, etc. For example, if other microprocessor 224 has determined that the vehicle is overheating, the other microprocessor 224 can communicate this information to the local microprocessor 202, which then can output a particular indicator on display 14 to warn the user. Or, if the knob 18 is allowed different modes of control, the other microprocessor 224 can control a different mode. Thus, if the knob 18 is able to control both audio stereo output as well as perform temperature control, the local microprocessor 202 can handle audio functions but can pass all knob sensor data to other microprocessor 224 to control temperature system adjustments when the device 10 is in temperature control mode.

In other embodiments, other microprocessor 224 can be a microprocessor in a host computer, for example, that commands the local microprocessor 202 to output force sensations by sending host commands to the local microprocessor. The host computer can be a personal computer, workstation, video game console, or other computing or display device, set top box, "network-computer", etc. Besides microprocessor 224, the host computer preferably includes random access memory (RAM), read only memory (ROM), input/output (I/O) circuitry, and other components of computers well-known to those skilled in the art. The host computer can implement a host application program with which a user interacts using knob 18 and/or other controls and peripherals. The host application program can be responsive to signals from knob 18 such as the transverse motion of the knob, the push or pull motion, and the rotation of the knob (e.g., the knob 18 can be provided on a game controller or interface device such as a game pad, joystick, steering wheel, or mouse that is connected to the host computer). In force feedback embodiments, the host application program can output force feedback commands to the local microprocessor 202 and to the knob 18. In a host computer embodiment or other similar embodiment, microprocessor 202 can be provided with software instructions to wait for commands or requests from the host computer, parse/decode the command or request, and handle/control input and output signals according to the command or request.

For example, in one force feedback embodiment, host microprocessor 224 can provide low-level force commands over bus 226, which microprocessor 202 directly transmits to the actuators. In a different force feedback local control embodiment, host microprocessor 224 provides high level supervisory commands to microprocessor 202 over bus 226, and microprocessor 202 manages low level force control loops to sensors and actuators in accordance with the high level commands and independently of the host computer. In the local control embodiment, the microprocessor 202 can independently process sensor signals to determine appropriate output actuator signals by following the instructions of a "force process" that may be stored in local memory 206 and independently calculation instructions, formulas, force magnitudes (force profiles), and/or other data. The force process can command distinct force sensations, such as vibrations, textures, jolts, or even simulated interactions between displayed objects. Such operation of local microprocessor in force feedback applications is described in greater detail in U.S. Pat. No. 5,734,373, previously incorporated herein by reference.

In an alternate embodiment, no local microprocessor 202 is included in interface device 10, and a remote microprocessor, such as microprocessor 224, controls and processes all signals to and from the components of interface device 10. Or, hardwired digital logic can perform any input/output functions to the knob 18.

While this invention has been described in terms of several preferred embodiments, there are alterations, modifications, and permutations thereof which fall within the scope of this invention. It should also be noted that the embodiments described above can be combined in various ways in a particular implementation. Furthermore, certain terminology has been used for the purposes of descriptive clarity, and not to limit the present invention. It is therefore intended that the following appended claims include such alterations, modifications, and permutations as fall within the true spirit and scope of the present invention.

That which is claimed is:

1. A method comprising:
   providing a manipulandum configured to be displayed in a first degree of freedom and a second degree of freedom;
   providing a means for sensing a position of said manipulandum in the first degree of freedom;
   providing a means for selecting a mode associated with the position of said manipulandum, said mode comprising at least one of a position control mode and a rate control mode;
   providing an actuator configured to output a processor-controlled force sensation to said manipulandum, said force sensation associated with said mode; and
   providing a processor configured to control said force sensation output from said actuator and to receive a signal from said sensing means, said processor configured to associate a value with a position of said manipulandum in said position control mode and to control a rate of change of said value in said rate control mode.

2. The method of claim 1, wherein the first degree of freedom comprises a rotary degree of freedom, and the second degree of freedom comprises a translatory degree of freedom, and wherein the translatory degree of freedom is co-axial with the axis of rotation of the rotary degree of freedom.

3. A device comprising:
   a manipulandum coupled to a grounded surface, the manipulandum moveable in a rotary degree of freedom and a transverse degree of freedom;
   a first sensor configured to sense a rotary position of the manipulandum and transmit a first sensor signal to a processor;
   a second sensor configured to detect a transverse position of the manipulandum and transmit a second sensor signal to a processor;
   a processor configured to receive the first and second sensor signals and to transmit an actuator signal to an actuator, the actuator signal configured to cause the actuator to output a force in the rotary degree of freedom, wherein the second sensor signal is based at least in part on the transverse position, and is configured to select a mode of operation of the manipulandum.

4. The device of claim 3, wherein the mode of operation comprises a first mode of operation and a second mode of operation.

5. The device of claim 4, wherein the force comprises a first force and a second force, and wherein the first force is configured to be output during the first mode of operation, and the second force is configured to be output during the second mode of operation.

6. The device of claim 3, wherein the device is disposed within a vehicle.

7. The device of claim 6, wherein the manipulandum is configured to control at least one of climate control, a stereo, a DVD player, a CD player, or a navigation system.

* * * * *

UNITED STATES PATENT AND TRADEMARK OFFICE
CERTIFICATE OF CORRECTION

| | | |
|---|---|---|
| PATENT NO. | : 7,489,309 B2 | |
| APPLICATION NO. | : 11/603294 | |
| DATED | : February 10, 2009 | |
| INVENTOR(S) | : Michael D. Levin et al. | |

It is certified that error appears in the above-identified patent and that said Letters Patent is hereby corrected as shown below:

Title Page, Item [60], Column 1, under Related U.S. Application Data, After "6,686,911", please delete "which is a continuation-in-part of application No. 09/087,022, filed on May 29, 1998, now Pat. No. 6,061,004, which is a continuation-in-part of application No. 09/049,155, filed Mar. 26, 1998, now Pat. No. 6,128,006,", please insert -- which is a continuation-in-part of parent application No. 09/049,155, filed Mar. 26, 1998, now Pat. No. 6,128,006 and application No. 09/087,022, filed May 29, 1998, now Pat. No. 6,061,004, --.

Title Page 2, Item [56], Column 1, under U.S. Patent Documents, please delete "9/1975," please insert -- 6/1973 --.

Title Page 2, Item [56], Column 1, under U.S. Patent Documents, please delete "5,186,695", please insert -- 5,188,685 --.

Title Page 3, Item [56], Column 2, under Foreign Patent Documents, please delete "WO WO9520788 8/1995".

Title Page 3, Item [56], Column 2, under Foreign Patent Documents, please delete "WO WO9532459 11/1995".

Title Page 3, Item [56], Column 2, under Other Publications, please delete "Grope", please insert -- GROPE --.

Title Page 3, Item [56], Column 2, under Other Publications, please delete "p.", please insert -- pp. --.

Title Page 4, Item [56], Column 1, After "Kim, Won S. et al., "Graphics Displays for Operator Aid", please insert -- in --.

Title Page 5, Item [56], Column 1, After "Bejczy,", please delete "Generation", please insert -- Generalization --.

Signed and Sealed this
Twenty-ninth Day of November, 2011

David J. Kappos
*Director of the United States Patent and Trademark Office*

CERTIFICATE OF CORRECTION (continued)
U.S. Pat. No. 7,489,309 B2

Title Page 5, Item [56], Column 1, After "McAffee, "Teleoperator Subsystem/Telerobot", please delete "Demonsdtrator:", please insert -- Demonstrator: --.

Title Page 5, Item [56], Column 1, please delete "Polyechnic", please insert -- Polytechnic --.

Title Page 5, Item [56], Column 1, After "of Fourteenth Annual", please delete "Northease", please insert -- Northeast --.

Title Page 5, Item [56], Column 1, After "Eberhardt et al.,", please delete "OMAR", please insert -- OMAR --.

Title Page 5, Item [56], Column 2, After "Teleoperation."", please delete "Soar", please insert -- SOAR --.

Title Page 5, Item [56], Column 2, After ""Cyberman Technical Specification," Logitech Cyberman", please delete "Swift", Please insert -- SWIFT --.

Column 3, line 7, please delete "Such", please insert -- such --.

Column 3, line 30, please delete "case", please insert -- ease --.

Column 5, line 30, please delete "1I", please insert --10 --.

Column 10, line 48, please delete "ill", please insert -- will --.

Column 16, line 18, please delete "the" please insert -- and --.